(12) United States Patent
Wang et al.

(10) Patent No.: US 11,290,409 B2
(45) Date of Patent: Mar. 29, 2022

(54) USER DEVICE MESSAGING APPLICATION FOR INTERACTING WITH A MESSAGING SERVICE

(71) Applicant: BYTEDANCE INC., Los Angeles, CA (US)

(72) Inventors: Zihao Wang, Los Angeles, CA (US); Justin Jia-Zhao Lim, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 16/939,306

(22) Filed: Jul. 27, 2020

(65) Prior Publication Data

US 2022/0029942 A1   Jan. 27, 2022

(51) Int. Cl.
| | |
|---|---|
| G06F 3/048 | (2013.01) |
| H04L 51/42 | (2022.01) |
| H04L 51/00 | (2022.01) |
| G06F 3/0484 | (2022.01) |
| H04L 51/56 | (2022.01) |

(52) U.S. Cl.
CPC ............ *H04L 51/22* (2013.01); *G06F 3/0484* (2013.01); *H04L 51/12* (2013.01); *H04L 51/36* (2013.01)

(58) Field of Classification Search
None
See application file for complete search history.

(56) References Cited

U.S. PATENT DOCUMENTS

| | | |
|---|---|---|
| 8,639,552 B1 | 1/2014 | Chen et al. |
| 9,300,609 B1 | 3/2016 | Beausoleil et al. |
| 9,645,996 B1 | 5/2017 | Ledet |
| 9,768,969 B2 | 9/2017 | Weinstein et al. |
| 9,842,218 B1 | 12/2017 | Brisebois et al. |
| 10,021,059 B1 | 7/2018 | Rao |
| 10,126,927 B1 | 11/2018 | Fieldman |
| 10,193,835 B1 | 1/2019 | Ledet |
| 11,095,720 B2 | 8/2021 | Salonen |
| 11,153,726 B2 | 10/2021 | Cheung et al. |
| 2002/0049786 A1 | 4/2002 | Bibliowicz et al. |

(Continued)

FOREIGN PATENT DOCUMENTS

| | | |
|---|---|---|
| CN | 1633115 A | 6/2005 |
| CN | 102710534 A | 10/2012 |

(Continued)

OTHER PUBLICATIONS

International Patent Application No. PCT/CN2021/106945; Int'l Search Report; dated Oct. 20, 2021; 6 pages.

*Primary Examiner* — Tuan S Nguyen
(74) *Attorney, Agent, or Firm* — BakerHostetler

(57) ABSTRACT

A messaging application may receive a first input indicative of starting a conversation and a second input by a first user. The messaging application may determine that the second input is indicative of at least one attribute associated with the conversation. The messaging application may send to a messaging service data comprising information indicating a start of a new conversation and information indicating that the at least one attribute is associated with the conversation, wherein the messaging service stores in at least one database the at least one attribute associated with a thread identifier of the conversation.

22 Claims, 33 Drawing Sheets

(56) References Cited

U.S. PATENT DOCUMENTS

| | | |
|---|---|---|
| 2002/0078007 A1 | 6/2002 | Herrero |
| 2003/0126089 A1 | 7/2003 | Fukuoka et al. |
| 2004/0015547 A1* | 1/2004 | Griffin ............... G06F 3/04842 |
| | | 709/204 |
| 2006/0206566 A1* | 9/2006 | Kelley ................ G06Q 10/107 |
| | | 709/205 |
| 2007/0198647 A1 | 8/2007 | Lingafelt et al. |
| 2008/0091782 A1 | 4/2008 | Jakobson |
| 2008/0178105 A1 | 7/2008 | Loewenstein |
| 2012/0030598 A1* | 2/2012 | Latzina ............... G06F 16/9038 |
| | | 715/771 |
| 2012/0143972 A1 | 6/2012 | Malik et al. |
| 2012/0158863 A1 | 6/2012 | Kikin-Gil et al. |
| 2013/0007648 A1 | 1/2013 | Gamon et al. |
| 2013/0018869 A1 | 1/2013 | Hanson et al. |
| 2013/0091439 A1* | 4/2013 | Sirpal ................. G02B 6/0001 |
| | | 715/752 |
| 2013/0110946 A1 | 5/2013 | Bradshaw |
| 2013/0198171 A1 | 8/2013 | Shah et al. |
| 2014/0324982 A1 | 10/2014 | Agrawal et al. |
| 2015/0006651 A1 | 1/2015 | Chmara et al. |
| 2015/0058324 A1 | 2/2015 | Kauwe |
| 2015/0200878 A1 | 7/2015 | Shih et al. |
| 2015/0312176 A1 | 10/2015 | Jones et al. |
| 2015/0319127 A1 | 11/2015 | Allen et al. |
| 2016/0191446 A1 | 6/2016 | Grol-Prokopczyyk et al. |
| 2016/0224939 A1 | 8/2016 | Chen et al. |
| 2016/0275453 A1* | 9/2016 | Powers ................ G06F 3/0482 |
| 2016/0301639 A1 | 10/2016 | Liu et al. |
| 2016/0321347 A1 | 11/2016 | Zhou et al. |
| 2016/0352677 A1 | 12/2016 | Gordon |
| 2016/0379175 A1 | 12/2016 | Bhattacharya et al. |
| 2017/0244662 A1 | 8/2017 | Olsen et al. |
| 2017/0308859 A1 | 10/2017 | Azmoon et al. |
| 2018/0114172 A1 | 4/2018 | Togwe et al. |
| 2018/0114198 A1 | 4/2018 | Ghotbi et al. |
| 2018/0152407 A1* | 5/2018 | Soni ....................... H04L 51/34 |
| 2018/0260782 A1 | 9/2018 | Bay |
| 2019/0034483 A1 | 1/2019 | Millius et al. |
| 2019/0058680 A1 | 2/2019 | Rosania et al. |
| 2019/0087498 A1 | 3/2019 | Danyluk et al. |
| 2020/0210053 A1 | 7/2020 | Baunach et al. |
| 2020/0244605 A1* | 7/2020 | Nagaraja ................ H04L 67/16 |
| 2020/0274916 A1 | 8/2020 | Choi |
| 2020/0396184 A1 | 12/2020 | Perazzo et al. |
| 2021/0034663 A1 | 2/2021 | Aher et al. |
| 2021/0105332 A1 | 4/2021 | Bellet et al. |
| 2021/0150398 A1 | 5/2021 | Bastide et al. |

FOREIGN PATENT DOCUMENTS

| | | |
|---|---|---|
| CN | 104205740 B | 2/2018 |
| CN | 109873745 A | 6/2019 |
| CN | 110048935 A | 7/2019 |

\* cited by examiner

| Group Name | Privacy | People | Actions |
|---|---|---|---|
| App | Private | | Edit |
| UserAGroup | Private | | Edit  Delete |
| UserDGroup | Private | | Edit |
| Group1 | Private | | Edit  Delete |
| GroupEmail | Private | | Edit  Delete |
| App team plus leaders | Private | | Edit |
| App-All | Private | | Edit |
| Patent Team | Private | | Edit  Delete |

FIG. 16

| Operator Options | 3018 | | | 3020 | | | | 3022 | 3019 | Enabled |
|---|---|---|---|---|---|---|---|---|---|---|
| Only Pinned Hashtags | | | Only Pinned Mentions | | | | | | Hide Todo States | |

Operator Priorities  
Drag and drop column (or row) headers to reorder your priorities. — 3002

Most Urgent   3006        3010                                                                                  Least Urgent

| 3004 | Boss | UserA | UserK | UserL | UserM | UserG | UserC | UserE | Group1 | Group2 | Test group | UserB Team | UserC group |
|---|---|---|---|---|---|---|---|---|---|---|---|---|---|
| #bugs | 3036 | | 1 | 1 | | | | | 2 | | | 1 | |
| #feed... | | 3018 | | | | | | | 1 | | | | |
| #back | | 1 | 1 | | 1 | | | | 9 | | | | |
| #Topic2 | | | | | | | | | 2 | | | | |
| #test | | | | | | | | | 1 | | | | |
| #CoronaVirus | | | | | | | | | | | 1 | | |
| #Topic3 | | | | | | | | | | | | | |
| #Topic1 | | 2 | | | | | 1 | | | | | | |
| #topic6 | 3016 | | | | | | | | | | | | |
| #newuser | | | | | | | | | 1 | | | | |
| #topic7 | | 3012 | | | | | | | | | | | |
| #topic 8 | | | | | | | | | 1 | | | | |
| #new-tag111 | | 1 | | | | | | | | | | | |

USER DEVICE MESSAGING APPLICATION FOR INTERACTING WITH A MESSAGING SERVICE

BACKGROUND

Communication in the workplace and social circles is increasingly being conducted using Internet-based tools. The Internet-based tools may be any software or platform. Conventional communication tools, such as email, may facilitate internal and external communications. However, conventional communication tools may not fulfil needs of users due to various limitations. As communication devices become more sophisticated, people continue to discover new tools to improve communication efficiency and effectiveness.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 16 shows a group view in a user interface of a messaging application in which users in a group may be displayed.

FIG. 30 shows an example user interface of a messaging application that is generated based on attributes of conversations and by which a user may provide input to reorganize the conversations.

DETAILED DESCRIPTION

Figure 1:
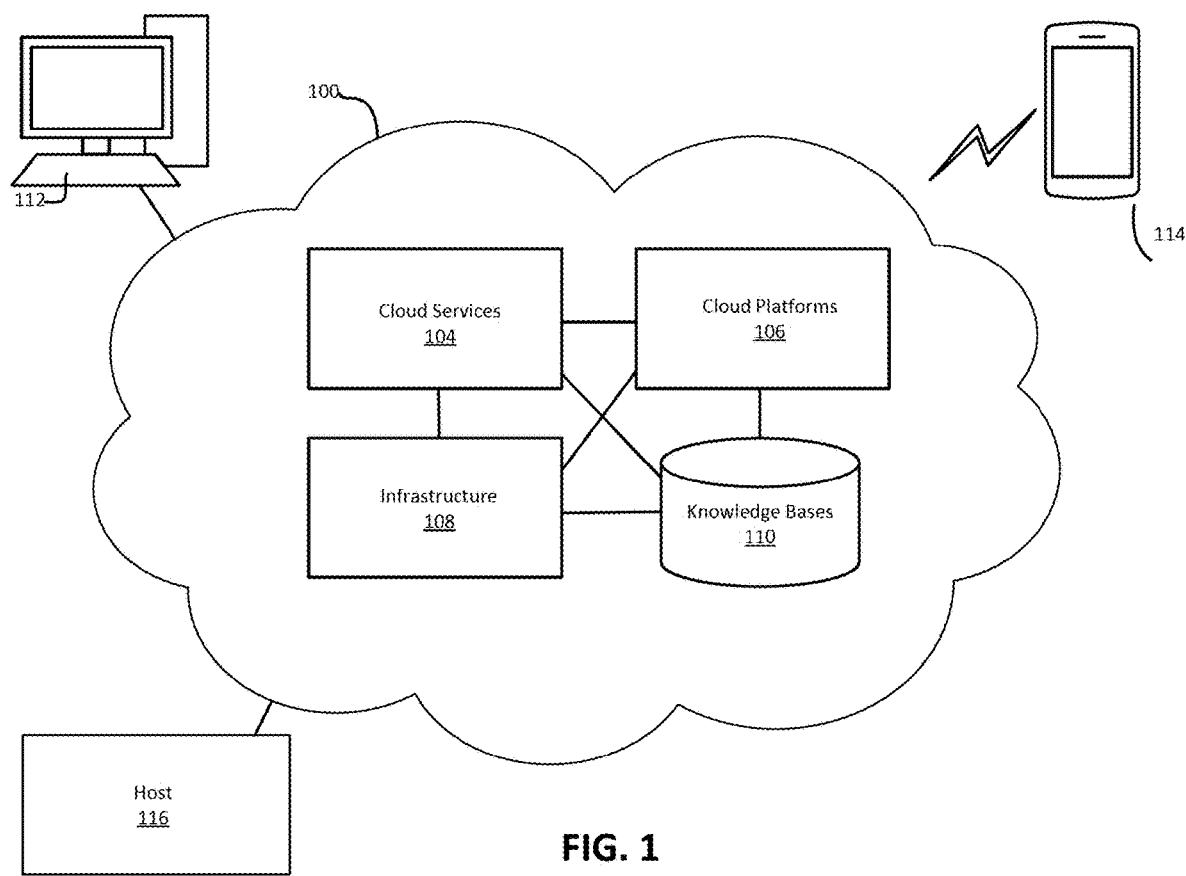
FIG. 1 shows example cloud computing network on which a messaging service may run.

FIG. 1 shows example components of a cloud computing system 100. By way of example and without limitation, cloud computing system 100 may be used to perform aspects of the disclosed subject matter. Cloud-based computing generally refers to networked computer architectures where application execution, service provision, and data storage may be divided, to some extent, between clients and cloud computing devices. The "cloud" may refer to a service or a group of services accessible over a network, e.g., the Internet, by clients, server devices, and by other cloud computing systems, for example.

In one example, multiple computing devices connected to the cloud may access and use a common pool of computing power, services, applications, storage, and files. Thus, cloud computing enables a shared pool of configurable computing resources, e.g., networks, servers, storage, applications, and services, that may be provisioned and released with minimal management effort or interaction by the cloud service provider.

As an example, a cloud-based application may store copies of data and/or executable program code in the cloud computing system, while allowing client devices to download at least some of this data and program code as needed for execution at the client devices. In some examples, downloaded data and program code may be tailored to the capabilities of specific client devices, e.g., a personal computer, tablet computer, mobile phone, and/or smartphone, accessing the cloud-based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code may be dynamically delivered, as needed or otherwise, to various clients accessing the cloud-based application. Details of the cloud-based computing architecture may be largely transparent to users of client devices. By way of example and without limitation, a PC user device accessing a cloud-based application may not be aware that the PC downloads program logic and/or data from the cloud computing system, or that the PC offloads processing or storage functions to the cloud computing system, for example.

In FIG. 1, cloud computing system 100 includes one or more cloud services 104, one or more cloud platforms 106, cloud infrastructure components 108, and cloud knowledge bases 110. Cloud computing system 100 may include more of fewer components, and each of cloud services 104, cloud platforms 106, cloud infrastructure components 108, and cloud knowledge bases 110 may include multiple computing and storage elements as well. Thus, one or more of the described functions of cloud computing system 100 may be divided into additional functional or physical components, or combined into fewer functional or physical components. In some further examples, additional functional and/or physical components may be added to the examples shown in FIG. 1. Delivery of cloud computing based services may involve multiple cloud components communicating with each other over application programming interfaces, such as web services and multi-tier architectures, for example.

Example cloud computing system 100 shown in FIG. 1 is a networked computing architecture. Cloud services 104 may represent queues for handling requests from client devices. Cloud platforms 106 may include client-interface frontends for cloud computing system 100, such as client-interface frontends of a messaging service. Cloud platforms 106 may be coupled to cloud services 104 to perform functions for interacting with client devices. Cloud infrastructure 108 may include service, billing, and other operational and infrastructure components of cloud computing system 100. Cloud knowledge bases 110 are configured to store data for use by cloud computing system 100, and thus, cloud knowledge bases 110 may be accessed by any of cloud services 104, cloud platforms 106, and/or cloud infrastructure components 108.

Many different types of client devices, such as devices of users of the messaging service, may be configured to communicate with components of cloud computing system 100 for the purpose of accessing data and executing applications provided by cloud computing system 100. For example, a computer 112, a mobile device 114, and a host 116 are shown as examples of the types of client devices that may be configured to communicate with cloud computing system 100. Of course, more or fewer client devices may communicate with cloud computing system 100. In addition, other types of client devices may also be configured to communicate with cloud computing system 100 as well.

Computer 112 shown in FIG. 1 may be any type of computing device, e.g., PC, laptop computer, tablet computer, etc., and mobile device 114 may be any type of mobile computing device, e.g., laptop, smartphone, mobile telephone, cellular telephone, tablet computer, etc., configured to transmit and/or receive data to and/or from cloud computing system 100. Similarly, host 116 may be any type of computing device with a transmitter/receiver including a laptop computer, a mobile telephone, a smartphone, a tablet computer etc., which is configured to transmit/receive data to/from cloud computing system 100.

In FIG. 1, communication links between client devices and cloud 100 may include wired connections, such as a serial or parallel bus, Ethernet, optical connections, or other type of wired connection. Communication links may also be wireless links, such as Bluetooth, IEEE 802.11 (IEEE 802.11 may refer to IEEE 802.11-2007, IEEE 802.11n-2009, or any other IEEE 802.11 revision), CDMA, 3G, GSM, WiMAX, or other wireless based data communication links.

In other examples, the client devices may be configured to communicate with cloud computing system 100 via wireless access points. Access points may take various forms. For example, an access point may take the form of a wireless access point (WAP) or wireless router. As another example, if a client device connects using a cellular air-interface protocol, such as CDMA, GSM, 3G, or 4G, an access point may be a base station in a cellular network that provides Internet connectivity via the cellular network.

As such, the client devices may include a wired or wireless network interface through which the client devices may connect to cloud computing system 100 directly or via access points. As an example, the client devices may be configured to use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol, e.g., CDMA, GSM, or WiMAX, as well as for "WiFi" connectivity using 802.11. Other types of communications interfaces and protocols could be used as well.

Figure 2:
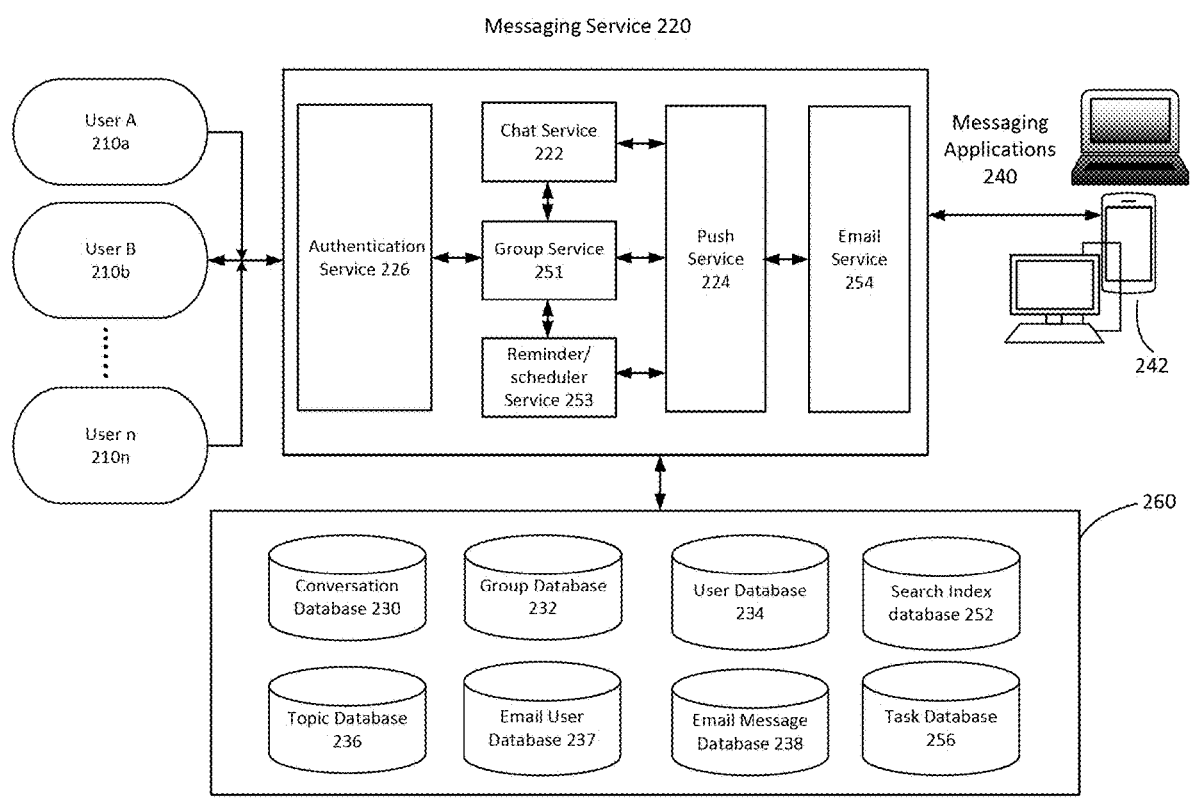
FIG. 2 shows an example messaging system in accordance with the present disclosure.

FIG. 2 shows an example messaging service 220 for carrying out the disclosed techniques. By way of example and without limitation, the messaging service 220 may run on the cloud network 100 in FIG. 1. The messaging service 220 may include a combination of cloud network devices and local devices. The messaging service 220 may include a chat service 222. The chat service 222 may be a device and/or a program running on a device of the messaging service 220.

The chat service 222 may be configured to receive inputs from users 210. The users 210 may registered as users of the messaging service 220 to exchange messages with each other within the messaging service 220. The users 210 may be users of a messaging application 240 operating on user devices 242. The user inputs may include requests to start conversations. A conversation may be initiated by selecting a "Start Conversation" icon in a User Interface (UI) of the messaging application 240 operating on any user device 242. A conversation may be initiated by a creator user without any other participants to the conversation having been identified. Participants of a conversation comprise any entities who are allowed to participant in the conversion in any manner. For instance, the participants of the conversation may be a creator user, a group that is invited to join the conversation, a assignor user who can assign a task to another participant (assignee user), the assignee user, an email participant that is invited to the conversation, and so on.

The chat service 222 may generate and/or manage the conversations. For instance, the chat service 222 may categorize the conversations. The chat service 222 may store the conversations, any associations with the conversation, and/or conversation metadata in one or more databases 260, such as a conversation database 230, a topic database 236, a group database 232, a user database 234, a search index database 252, a task database 256, an email user database 237, email message database 238. The inputs may include messages, such as messages to be added to an existing conversation or a new conversation. The chat service 222 may add the messages to the conversation. The chat service 222 may store the messages and/or message associations in a database, such as the conversation database 230.

The messaging services 220 may determine that the messages include information identifying users, such as usernames, handles (i.e., usernames followed by an @ symbol), accounts, and so on. The messaging service 220 may add the identified users to the conversations. The messaging service 220 may store associations of the users and the conversation, such as in the conversation database 230, the group database 232, the user database 234, and/or the search index database 252. The users may be granted access permissions to the conversations, such as to view feeds with previously communicated messages in the conversations.

The messaging services 220 may determine that the messages include information indicative of a topic. The topic may be associated with a corresponding conversation. The messaging service 220 may add the topic to one or more databases, such as the topic database 236. The messaging services 220 may store associations of the topic and the conversations, such as in the conversation database 230 and/or the topic database 236.

The messaging services 220 may determine that the messages include information identifying groups. The groups may be groups of users. The messaging service 220 may add the groups to conversations. The messaging service 220 may store associations of the groups and the conversations, such as in the conversation database 230, the group database 232, the user database 234, and/or the search index database 252.

The messaging services 220 may determine that the messages include information indicative of tasks assigned to users. The messaging service 220 may further receive information indicative of due dates of the tasks. The tasks and due dates may be associated with the users and conversations. The messaging service 220 may add the tasks and due dates to the databases 260, such as the task database 256. The messaging service 220 may store associations of the tasks, due dates, users, and conversations, such as in the conversation database 230, the user database 234, and the task database 256.

The messaging services 220 may determine that the messages may include email addresses. The email addresses may be associated with conversations. The email addresses may be intended recipients of the messages in the conversations. The messaging service 220 may add the email addresses to the conversations. The messaging service 220 may store associations of the email addresses, and the conversations, such as in the conversation database 230, an email user database 237, and/or an email message database 238.

The messaging service 220 may include a push service 224. The push service 224 may be a device and/or a program running on a device of the messaging service 220. The push service 224 may receive data from the chat service 222, such as indications of user inputs. The push service 224 may store and/or access data in the databases 260. The push service 224 may push (e.g., send, display, etc.) data, such as indications of the user inputs to the user devices, such as via the messaging application 240. The push service 224 may push data to an email address external to the messaging service 220.

The messaging service 220 may include other services. The other services may include a group service 251. The group service 251 may manage groups of users. The group service 251 may manage stored associations of the groups. The group service 251 may identify the members included in a group by searching the search index database 252. The other services may include a reminder/scheduler service 253. The reminder/scheduler service 253 may determine associations between the due dates and tasks. The reminder/scheduler service 253 may send reminders associated with the due dates and/or tasks. The reminder/scheduler service 253 may manage stored due dates and/or tasks.

The other services may include an email service 254. The email service 254 may generate email messages and send email messages to email addresses external to the messaging service 220. The email service 254 may receive data from email addresses external to the messaging service 220. The email service 254 may determine a conversation associated the data received from the email address and generate corresponding messages to be sent to the users in the conversation. The other services may further include an authentication service 226. The authentication service 226 may authorize and verify access to various conversations. The authentication service 226 may grant participants of conversations hierarchical authorities. For instance, only the participants with a certain level of authority may be allowed to add other participants, assign tasks, and so on.

It should be appreciated that the messaging service 220 in FIG. 2 is merely illustrative and other implementations might be utilized. It should also be appreciated that the functionality disclosed herein may be implemented by one or more servers or computing devices. Additionally, it should be appreciated that the functionality disclosed herein might be implemented in software, hardware or a combination of software and hardware.

Figure 3:
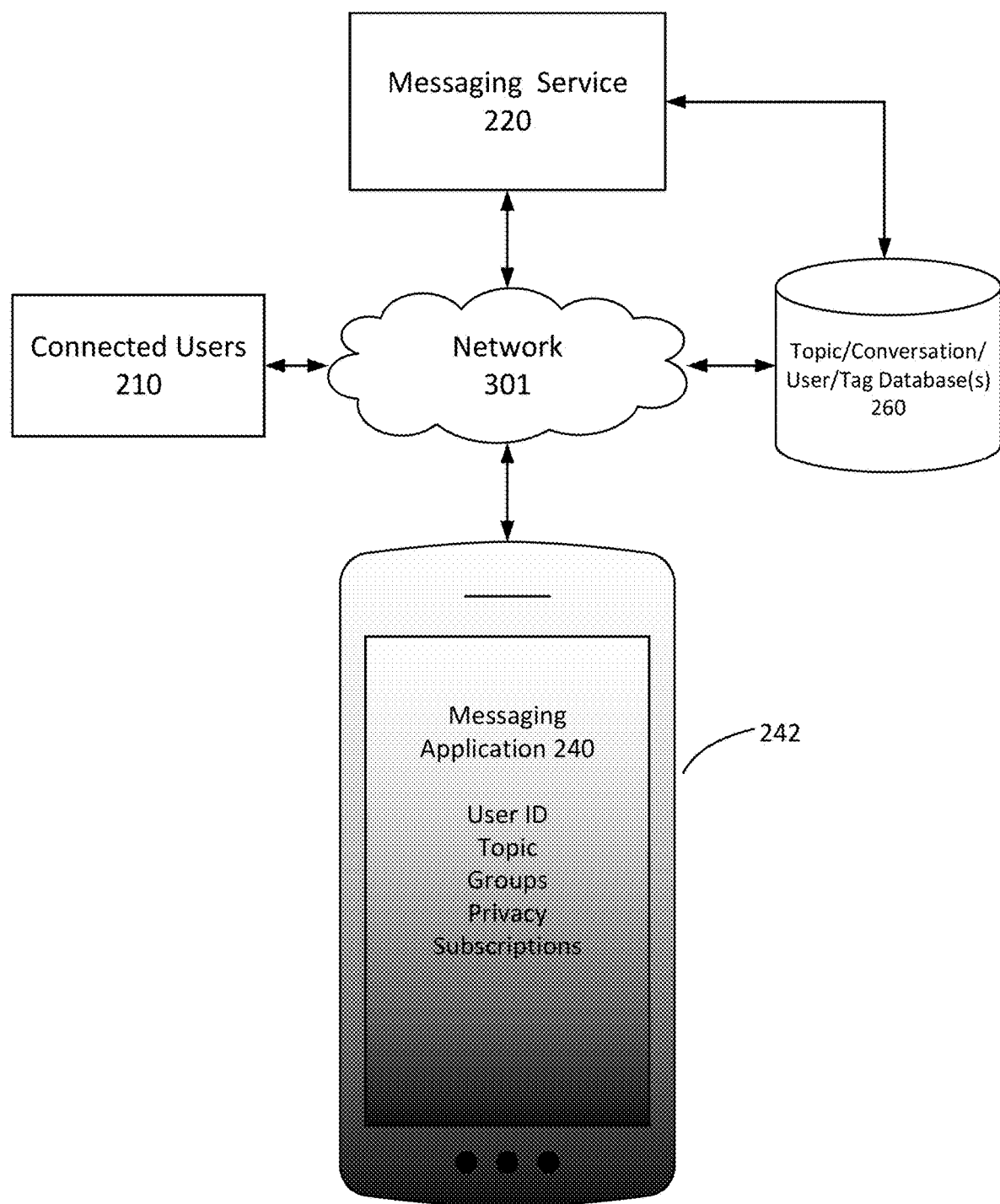
FIG. 3 shows an example messaging technique, which may be performed by a messaging service and a messaging application/service.

FIG. 3 shows an example of messaging service 220. The messaging service 220 may be in communication with a network 301. The network 301 may comprise Internet. The network 301 may include one or more cloud network components. The network 301 may communicate via the network with one or more databases 260. The databases 260 may be the same or similar to the databases 230-238 in FIG. 2. The databases 260 may include a topic database, a conversation database, a user database, and/or a tag database, as examples. The messaging service 220 may store attributes and/or associations in the databases 260. The messaging service 220 may access (e.g., query) the databases 260 for attributes, associations, or other data.

The messaging service 220 may communicate via the network 301 with one or more user devices 242. The messaging service 220 may communicate with the devices 302 via a messaging application 240 operating on the user devices 242. The messaging application 240 may be configured to manage data and permissions, such as conversations, conversation topic tags, users, groups, privacy, and so on.

The messaging service 220 may communicate via the network 301 with connected users 210. The connected users 210 may be users that are participants to a conversation of the messaging service 220 and/or messaging application 240. For example, the connected users 210 may receive messages associated with conversations via an external email address. The connected users 210 may send messages to the messaging service 220, the messaging application 240, conversations, and/or other users from external email addresses.

Figure 4:
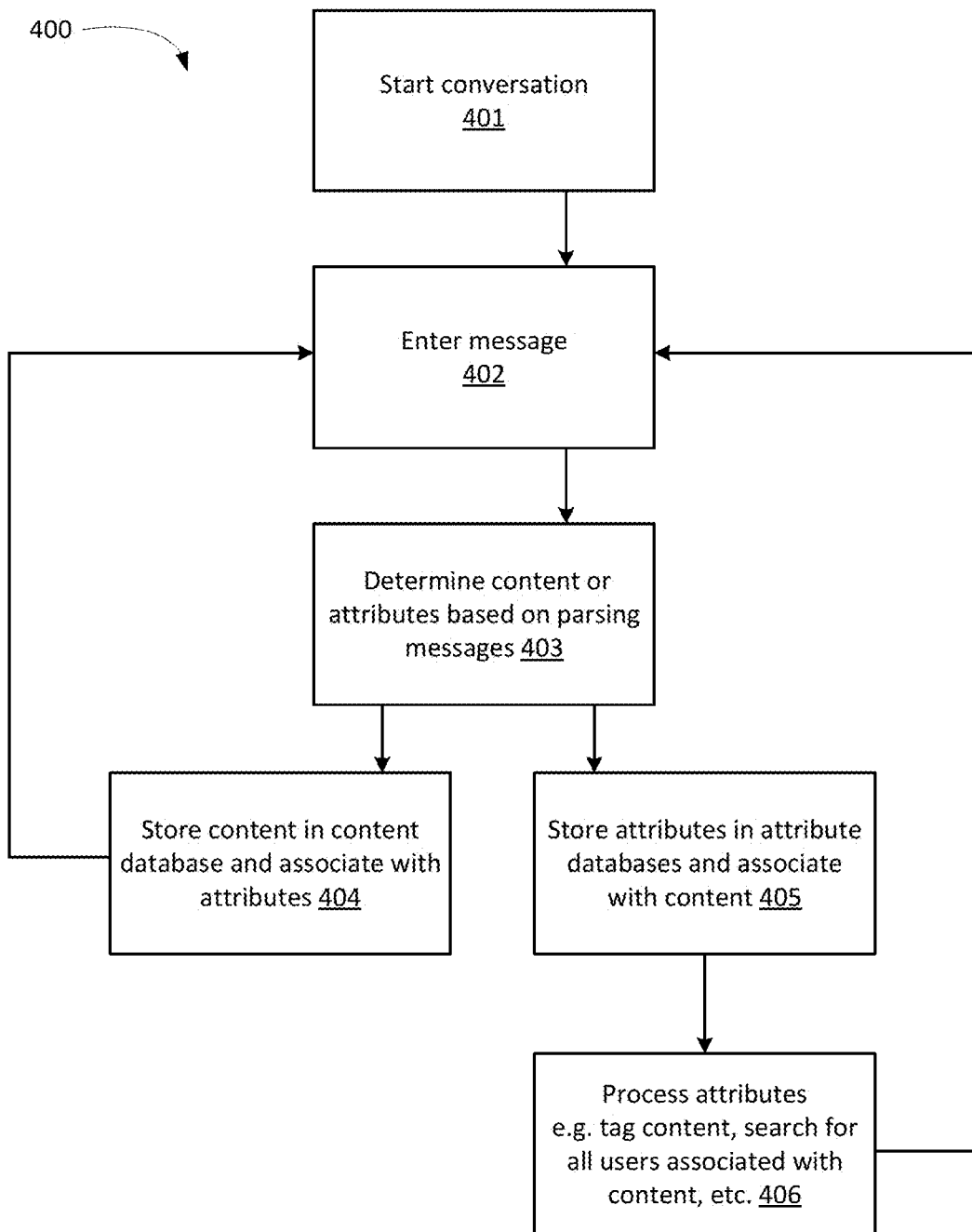
FIG. 4 shows an example messaging technique, which may be performed by a messaging service and a messaging application/service.

FIG. 4 shows a messaging technique 400. The technique 400 may be performed by a messaging service (e.g., messaging service 220 in FIG. 2 and FIG. 3), a messaging application (e.g., messaging application 240 in FIG. 2 and in FIG. 3), one or more users 210, and/or one or more user devices 242. At 401, a conversation may be started. The conversation may be started by a creator user (i.e., user who causes the creation of the conversation) by entering an input via the messaging application requesting that a conversation be started. For example, the user may select a "Start a conversation" icon in the UI of the messaging application displayed on a user device. A chat service (e.g., chat service 222 in FIG. 2) may receive the input and may generate a conversation. The conversation may be initiated without any other participants to the conversation having been identified.

At 402, a message may be entered. The message may be entered by a user via the messaging application. The message may be entered in a conversation, such as via an input field shown in the UI of the messaging application. The message may be entered before any other participants to the conversation have been identified. The message may comprise text. The chat service may receive the message. The message may be added to the conversation. The message may be sent to one or more users associated with the conversation. The message may be sent to one or more external users, such as to external email addresses that have been added to the conversation. An association of the message and the conversation may be stored in a database (e.g., databases 260 in FIGS. 2-3).

At 403, the message may be parsed to determine content and/or an attribute. The message may be parsed by the messaging application (e.g., messaging application 240 in FIGS. 2-3) and/or the messaging service (e.g., messaging service 220 in FIGS. 2-3). For example, the messaging application may determine an attribute of the message, such as one identified by a special character in the message and may send an indication of the attribute to the messaging service.

At 404, content of the message may be stored in a content database (e.g., databases 260 in FIGS. 2-3). An association of the content and one or more users, such as users tagged in the message, may be stored in the database, such as the user database 234, the group database 232, the search index database 252. The content and/or association may be stored in the database by the messaging service (e.g., messaging service 220 in FIGS. 2-3).

At 405, an attribute of the message may be stored in an attribute database, such as the topic database 236, the user database 234, the group database 232, the search index database 252, the email user database 237, and the task database 256. An association of the attribute and the content of the message may also be stored in the attribute database and any other databases. For instance, the attribute and/or association may be stored in the databases 260 by the messaging service 220 as shown in FIGS. 2-3.

At 406, the attribute of the message may be processed. For example, the content of the message may be tagged by a topic associated with a conversation. As another example, a search may be performed for all users associated with the content. The attributes of the message may be processed by the messaging service.

In contrast to most messaging systems that are based on direct exchanges between users, in some embodiments, the messaging system (e.g., messaging service and messaging application) in accordance with the present disclosure is more message centric, where the message is content and users are attributes of that content. For example, the present disclosed techniques do not require identification of a recipient or subscriber of a conversation. Rather, the present messaging system allows creation of a conversation, such as a series of messages, by a creator user (e.g., user who causes the creation of the conversation) without any other participants having been identified. The participants of the conversations are just creator users, not merely recipients. The creator users may post messages, label topics of the conversation, add other participants to the conversation, assign tasks to other participants, and so on.

After a conversation has been created, other participants may be added to the conversation. Unlike most messaging systems, in which participants to a conversation are defined at the inception of the conversation, the present messaging system allows participants to be brought into a conversation at any time. Participants may be brought into an existing conversation by entering the username of a user of the present messaging service, the name of a group, or an email address in the conversation. The participants may then be added to the conversation and receive past and future messages communicated in the conversation, such as in a feed or in notifications. The added participants may participate in the conversation, such as by posting messages in the conversation, by labeling topics of the conversation, by assigning tasks, and/or by adding other participants to the conversation.

Figure 5:
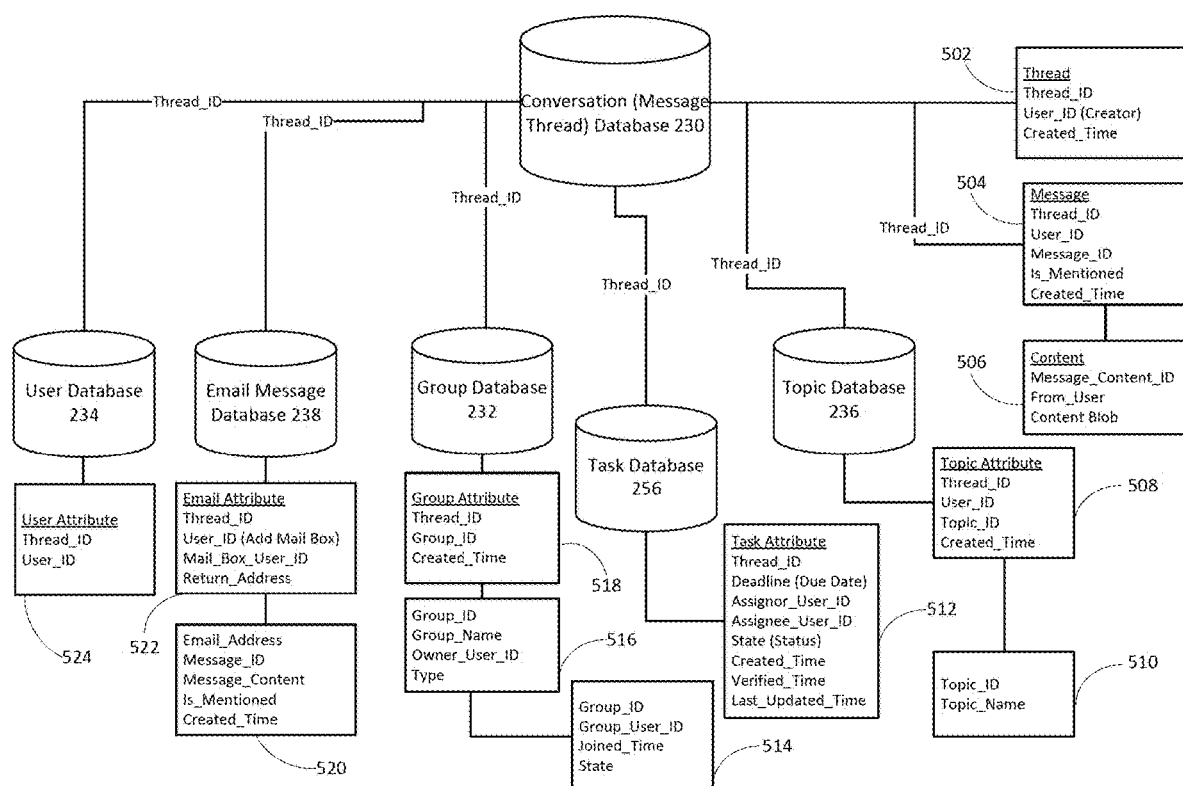
FIG. 5 shows an example data model that may be used in accordance with the present disclosure.

FIG. 5 illustrates an example embodiment of a data model in accordance with the present disclosure. It should be appreciated that the example data model in FIG. 5 is merely illustrative and other arrangements might be utilized. As illustrated, the data model is conversation centric. In other words, the conversation is the primary data in the database. Other data, such as user data, topic date, task data, and so on, are attributes of the conversation. As shown, the conversation database 230 of a messaging service includes a plurality of conversations. The conversation database 230 includes a plurality of tables. For example, the Thread table 502, the Message table 504, and the Content table 506 are all stored in the conversation database 230.

The thread table 502 contains items such as Thread_ID, User_ID, and Created_Time. The Thread_ID is the primary key that is used to reference other data and attributes. For example, Thread_ID is used to look up messages associated with a particular Thread_ID. Thread_ID is also used to look up attributes in the attribute databases related to a thread as identified by a Thread_ID as explained more fully below. Before explaining the attribute databases, the records stored in the conversation database 230 are more fully explained.

Regarding the conversation database 230, Each time that a new thread (e.g., new conversation) is created by a user, the message service generates and assigns a new Thread_ID and creates a new record in the Thread table along with the User_ID of the user who created the thread and a time that the thread was created (Created_Time). Additionally, information associated with each message in a particular thread (e.g., particular conversation) is stored in the Message table 504 along with the Thread_ID, the User_ID (for the user who created the message), a Message_ID that identifies each message, and time that the message was created (Created_Time), and an entry identifying other users or groups that may have been mentioned and added in a conversation (Is Mentioned). The users or groups that have been mentioned (e.g., prefaced by the @ symbol) in a conversation are hereinafter referred to as "Mentions." The content of each message may be stored separately in the Content table 506 and referenced by a corresponding message ID. That's because the storage size of a message can vary significantly depending on whether it contains a short string or some form of media such as a JPEG or a video.

As noted above, each thread (conversation) may have associated attributes. Those attributes are referenced by the Thread_ID of a conversation. For example, Thread_ID is a key into each attribute database and can be used to look up all of the associated attributes to a particular conversation. As illustrated in FIG. 5, a user is an attribute of a conversation. Users who are associated with a particular conversation can be determined by searching the user database 234 for all users associated with a particular Thread_ID corresponding to the particular conversation. The search would return all matching User_IDs.

Similarly, a search of the email message database 238 would return all User_IDs for users that are associated with the thread via email. That is, each time that an email address is added to a conversation, a new record would be created in the email message database 238. Each record would store the User_ID of the user who added the email address in the conversation. Additionally, a Return_Email address corresponding to the conversation would be assigned by the messaging service (e.g., messaging service 220) and stored in the email message database 238. Each email participant (i.e. a participant added via an email address) would also be assigned a Mail_Box_User_ID that can be used to look up the associated Email_Address. The Email Address is stored along with the Message_ID for the message where the email address was included. The Message Content, etc. for each email message is also stored in the email message database 238 (e.g., email attribute tables 522 and 520).

The attribute databases also include, for example, a group database (e.g., group database 232). The group database 232 stores information about groups associated with conversations (e.g., group attributes). The data stored in the group database 232 include one or more of a Thread_ID, a Group_ID, and a Created_Time (the time that the group was created). The Group_ID is further used to point to a record that contains Group_Name (the name of the group), Owner_User_ID (the User_ID of the owner of the group, e.g., the creator of the group), a group type (e.g., private or public group), a joined time (the time a member joined the group), and a state associated with the groups.

In an embodiment, the attribute databases include a task database (e.g., task database 256) that stores information indicative of task assignments associated with the conversations (e.g., task attributes). The task attributes stored in the task database 256 are also referenced by Thread_ID of each conversation. Among some of the data and information stored in the task database 256 include Deadline (which is essentially a due date), an assignor and assignee user IDs (Assignor_User_ID and Assignee_User_ID), and State (e.g., status). A created time, a verified time, and a last updated time may also be associated with the records stored for the tasks.

According to an embodiment, the attribute databases also include a topic database (e.g., topic database 236) that stores information indicative of topics associated with the conversations (e.g., topic attributes). The topic database is referenced and associated with a conversation by way to Thread_ID of each conversation and generally includes, a user ID, a Topic_ID, and a created time associated with each topic. Topic_ID is used to reference a topic name (Topic_Name). Each time that a new topic is added to a conversation, e.g., by entry into a message preceded by a hash tag in a conversation, the messaging service (e.g., messaging service 220) will store an entry into the topic database 236 referenced by the Thread_ID of the conversation.

As described above, these various attributes are all associated with Thread_IDs that are generated when a new thread (e.g., new conversation) is created in the messaging service (e.g., messaging service 220). Consequently, the messaging service 220 can search for and retrieve various attributes associated with the conversation. A conversation and a thread are used herein somewhat interchangeably. In one example, the message thread database 230 and the plurality of attribute databases (e.g., topic database 236, task database 256, group database 232, email message database 238 and user database 234) may be stored on a same server or device. In another example, the message thread database 230 and the plurality of attribute databases may be separately stored on different servers or devices. The message thread database 230 and the plurality of attribute databases may be hosted on one or more physical servers or one or more virtual servers.

Figure 6:
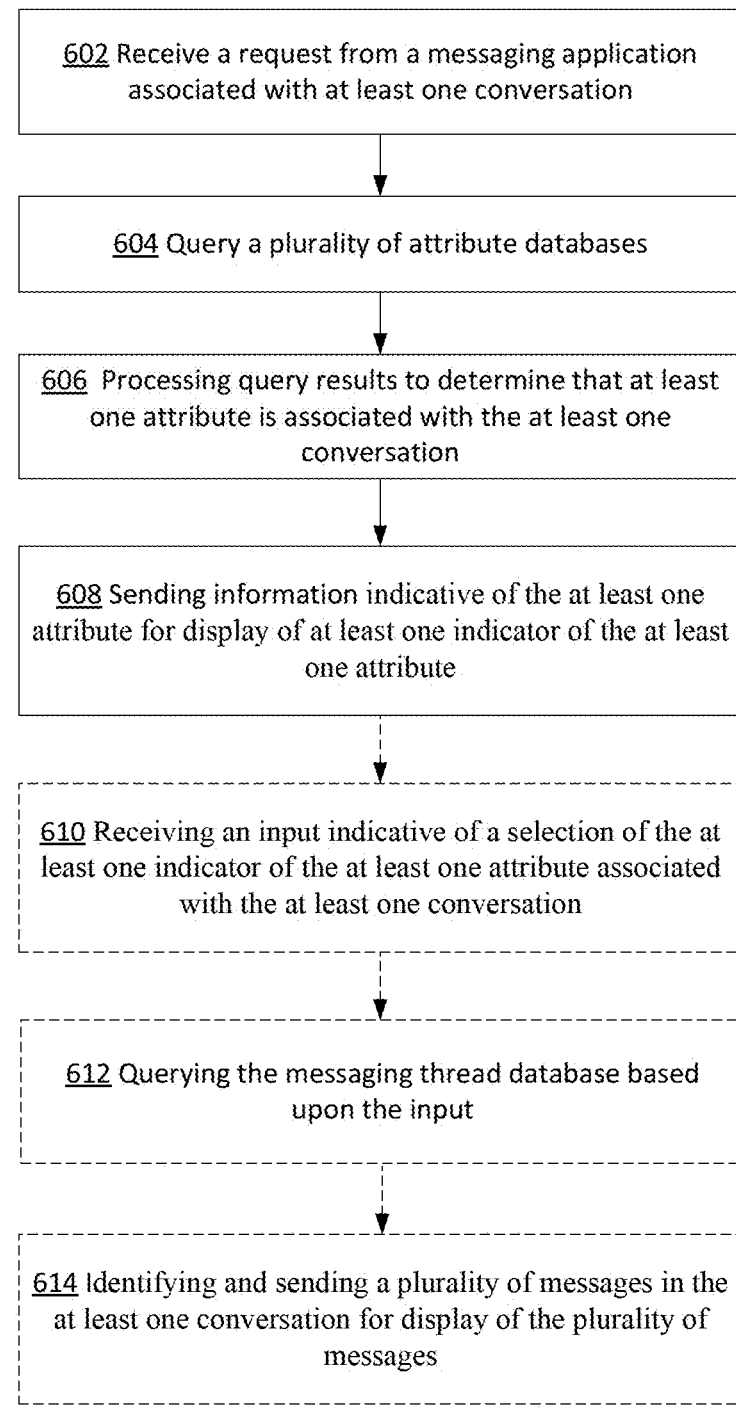
FIG. 6 shows an example process, which may be performed by a messaging service in accordance with the present disclosure.

FIG. 6 shows an example process 600 performed by the messaging service (e.g. messaging service 220) in connection with the data model as shown in FIG. 5. Although depicted as a sequence of operations in FIG. 6, those of ordinary skill in the art will appreciate that various embodiments may add, remove, reorder, or modify the depicted operations.

At 602, the messaging service 220 receives a request from a messaging application, e.g., messaging application 240 operating on a user device 242, indicative of at least one of the conversations. For example, a user may have requested by way of the messaging application 240 information indicative of attributes associated with one or more conversations in which the user participates. For example, the messaging application 240 operating on the user device 242 may request information indicative of attributes (e.g., topic, user, group, task) associated with the conversations for that user. In response to the request, at 604, the messaging service 220 will look up all Thread_IDs associated with the User_ID of that user in the user database 234 and further query other attribute databases to determine various attributes associated with the identified conversations based on the Thread_IDs. In one example, the messaging service 220 may look up all topics in the topic database associated with the Thread IDs. At 606, the messaging service 220 processes the query results to determine that at least one attribute (e.g., topic attribute) is associated with at least some of the conversations.

Figure 12:
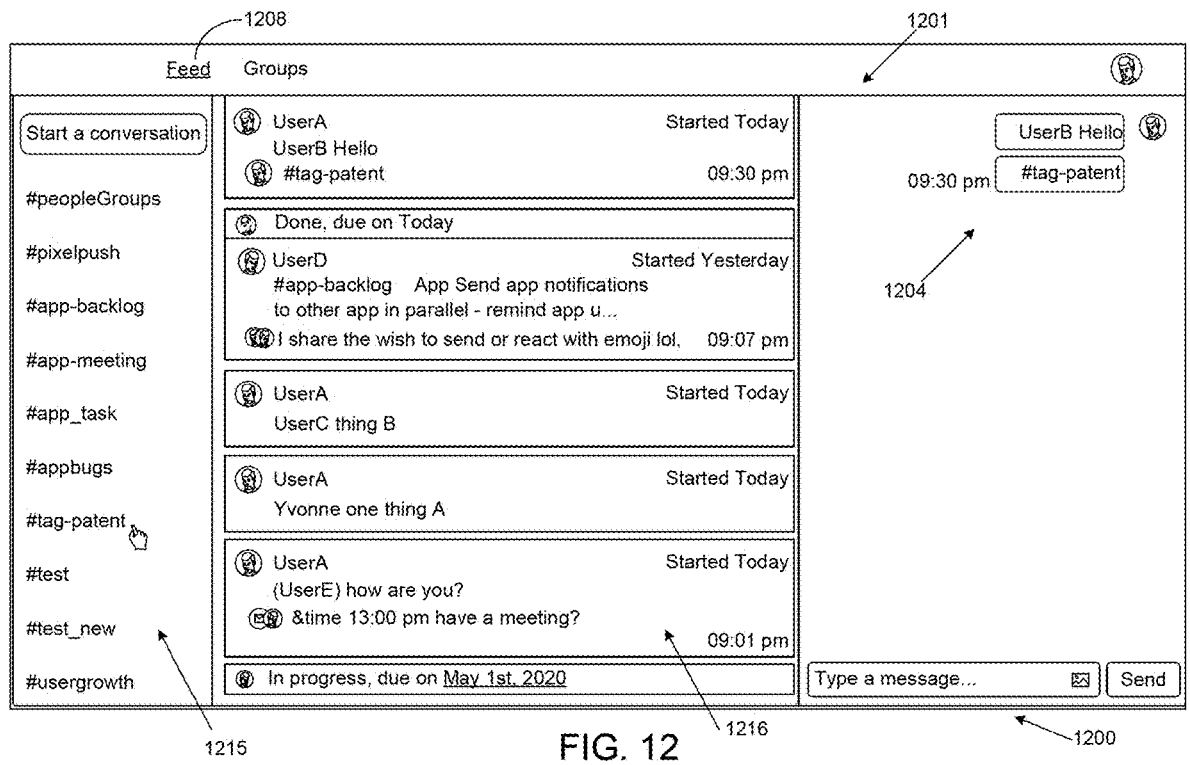
FIG. 12 shows an example user interface of a messaging application in which a topic tag may be added to a conversation.
Figure 25:
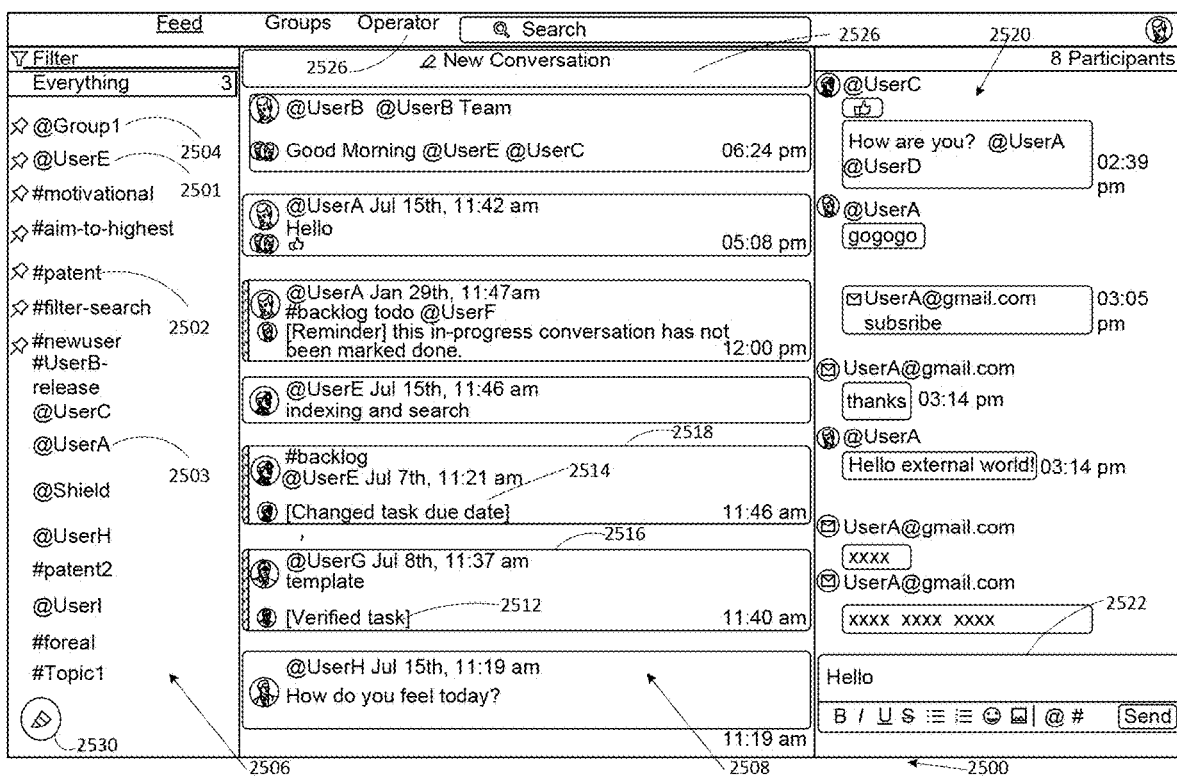
FIG. 25 shows an example user interface of a messaging application in in accordance with the present disclosure.

At 608, the messaging service 220 will send the attribute information associated with the conversations to the messaging application 240 for display of indicators of attributes on the user device 242. For example, as shown in FIG. 12, a plurality of topics associated with the conversations are displayed on the leftmost column 1205 of the user interface (UI) 1200. In some embodiments, there may be a plurality of attributes and they may be assigned different priorities by the messaging service 220 or the messaging application 240. The messaging service 220 or the messaging application 240 may organize the plurality of attributes based on their priorities. In an example, the Mention (i.e., user or group added to conversations) attribute may have a higher priority than the topic attribute. For example, the Mention attribute (e.g., UserE 2501 and Group1 2504) in FIG. 25 may be assigned a higher priority than the topic attribute. The indicators of the attributes in FIG. 25 are displayed based on the Mention attribute under which one or more topics (if any) may be displayed. In an example, there may be multiple topics associated with conversations that have a particular Mention attribute. As illustrated in FIG. 25, there are multiple topics (including the "patent" topic 2502) are associated with the conversations that have the Mention attribute UserE 2501, and the multiple topics are displayed under the Mention attribute UserE 2501 since a Mention attribute has a higher priority than a topic attribute in this example.

In some embodiments, in response to receiving a request from the messaging application 240, the messaging service 220 may query the databases 260 (e.g., user database 234, task database 256, etc.) to determine tasks associated with any particular user. For example, the messaging service 220 receives a request from the messaging application 240, the request including identification information of a particular user (e.g., user ID). In response, the messaging service 220 searches the user database 234 based on the user ID to identify Thread_IDs corresponding to conversations in which the user is involved. The messaging service 220 may then query the task database 256 based on the Thread_IDs to look up tasks associated with the conversations. The messaging service 220 may identify Assignor_User_ID and Assignee_User_ID of each task based on searching the task database 256. The messaging service 220 may then determine whether any of the tasks is associated with the particular user based on determining whether either the identified Assignor_User_ID or the Assignee_User_ID is same as the user ID of the particular user. Upon determining that any task is associated with the particular user, the messaging service 220 sends to the messaging application 240 information indicative of the determined tasks for display of the tasks associated with the particular user. In an example, the messaging application 240 may categorize or order the tasks based on the due dates associated with the tasks. In another example, the messaging application 240 may categorize or order the tasks based on information associated with the assignors or assignees of the tasks. The messaging application 240 may display the categorized or ordered tasks in a predetermined area of a UI or in a window overlaid on the UI.

In an embodiment, additional interactions between the messaging application 240 and the messaging service 220 may occur. For example, at 610, the messaging service 220 receives input from the messaging application 240 indicating that the messaging application 240 has selected an attribute such as a topic from a displayed list of topics as shown on the leftmost column in FIG. 12. In response, at 612, the messaging service 220 queries the message thread database 230 for messages associated with the selected attribute, e.g., the topic. Thereafter, the messaging service 220 sends the messages to the messaging application 240 for display of the messages on the user device 242. For example, as shown in FIG. 12, the messages associated with the selected topic are displayed on the rightmost column 1204 of the UI 1200.

Figure 7:
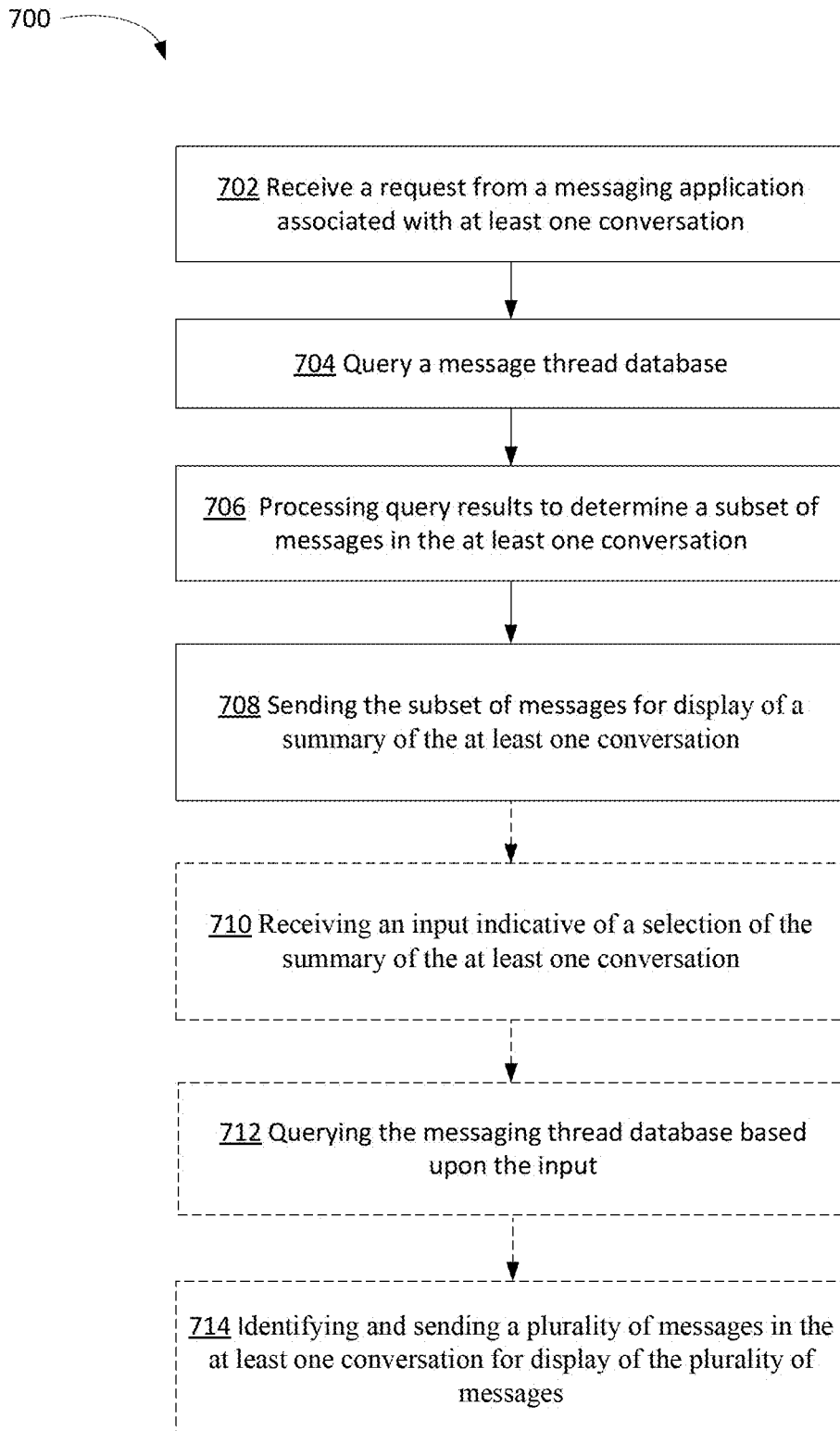
FIG. 7 shows another example process, which may be performed by a messaging service in accordance with the present disclosure.

FIG. 7 shows another example process 700 illustrating the interaction between a messaging application (e.g., messaging application 240) and the data model maintained in the messaging service 220. Although depicted as a sequence of operations in FIG. 6, those of ordinary skill in the art will appreciate that various embodiments may add, remove, reorder, or modify the depicted operations. In another embodiment, the messaging service 220 receives a request from a messaging application (e.g., messaging application 240 operating on a user device 242) associated with a user indicative of at least one of the conversations at 702. In response, the messaging service 220 queries the message thread database 230 at 704. For example, the messaging service 220 would look up the corresponding conversations in which the user has participated. Thereafter, at 706, the messaging service 220 processes the query results to determine a subset of messages in each conversation. In one embodiment, the subset of messages of each conversation may be an initial message and a last message in the conversation. The messaging service 220 may create a summary of each conversation based on the subset of messages. The messaging service 220 sends the subset of messages to the messaging application 240 for display of the summary of each conversation at 708. For example, as shown in FIG. 12, summaries of the conversations are displayed in the middle area 1216 of the UI 1200.

In some embodiments, at 710, the messaging service 220 may receive a request indicating that a selection of one of the summaries was made by the messaging application 240. In that case and in response, at 712, the messaging service 220 may again query the conversation database 230 to retrieve all or a plurality of messages in the corresponding conversation. In the embodiments, the messaging service 220 may retrieve all messages in the corresponding conversation. In other embodiments, the messaging service may retrieve a subset of the messages in the corresponding conversation. For example, when the number of messages and the content of the messages are such that the amount of storage required by the user device (e.g., user device 242) to store the messages is above a threshold, it may be advantageous for the messaging service 220 to only retrieve a subset of messages to send to the user device 242. In a non-limiting example, the messaging service 220 may retrieve only the most recent messages in the corresponding conversation. At 714, the messaging service 220 sends to the messaging application 240 at least a subset of the retrieved messages in the conversation so that the messaging application 240 can display the messages on the user device 242.

Figure 8:
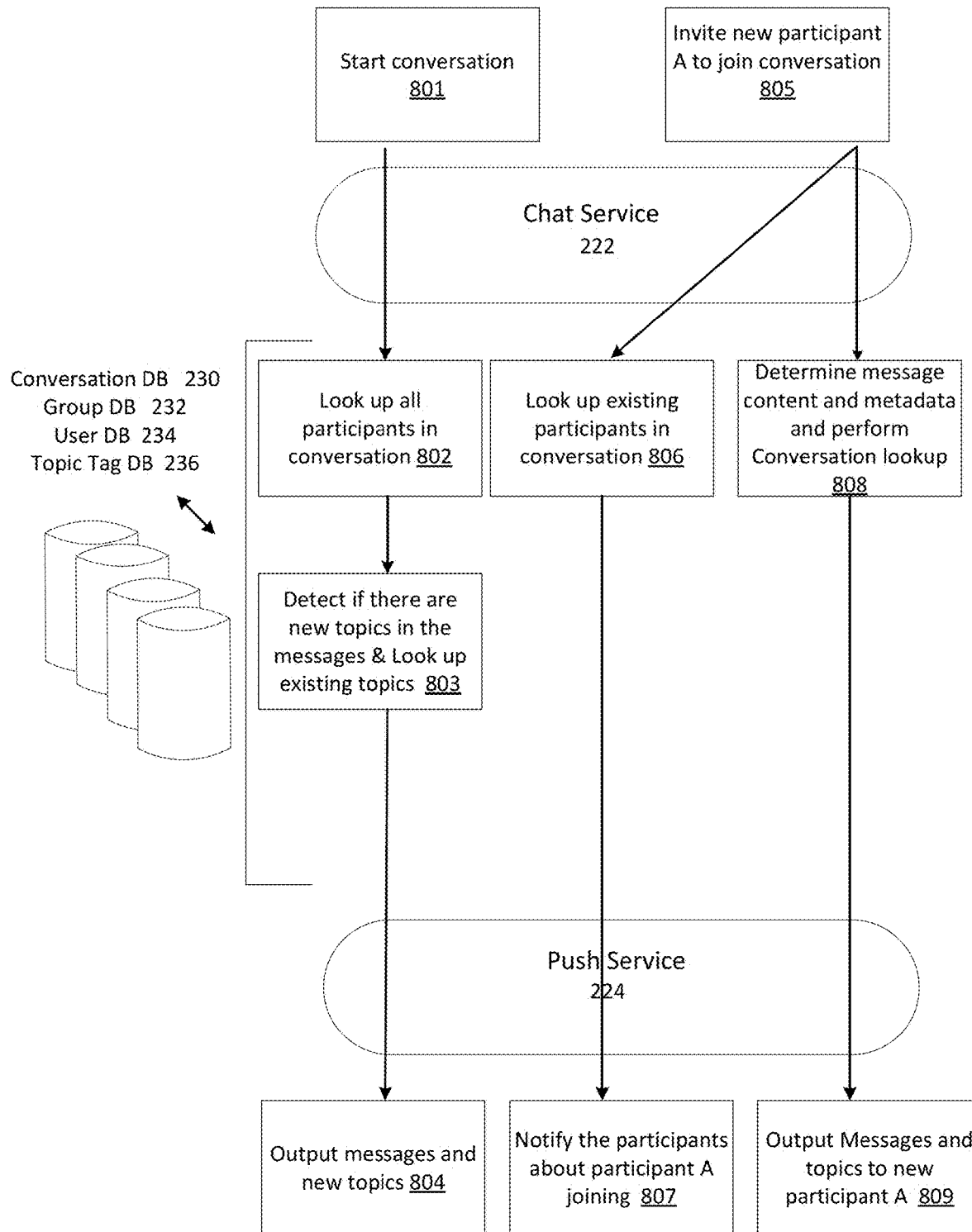
FIG. 8 shows an example messaging technique, which may be performed by a chat service and a push service of a messaging service.

FIG. 8 shows messaging techniques. The techniques may be performed by a messaging service (e.g., messaging service 220 in FIG. 2 and FIG. 3), a messaging application (e.g., messaging application 240 in FIG. 2 and FIG. 3), one or more users 210, and/or one or more user devices 242. At 801, a conversation may be started. The conversation may be started by a creator user by entering an input via the messaging application requesting that a conversation be started. For example, the user may select a "Start a conversation" icon in the UI of the messaging application displayed on a user device. A chat service (e.g., chat service 222 in FIG. 2) of the messaging service may receive the input and may generate a conversation. The conversation may be initiated by the creator user without any other participants to the conversation having been identified.

At 802, a look-up may be performed for all participants (e.g., creator users and any other participants) in the conversation upon receiving a message by the messaging service 220, such as the chat service 222. The content of the message may be determined. The content may be parsed by the messaging service 220, such as the chat service 222. Parsing the content may include determining one or more attributes of the message and/or conversation. For example, the content may include text comprising a predetermined special character denoting an attribute, such as a topic, a user, and/or a group of users. The look-up may be performed by the messaging service 220, e.g., the chat service 222. The look-up may be performed by querying one or more databases 260. The databases 260 may include the conversation database 230, the group database 232, the user database 234, the topic database 236, the task database 256, the email user database 237, and/or the email message database 238. Associations of the participants and the conversation may have been stored in the databases 260, such as by the chat service 222.

At 803, a topic associated with the conversation may be determined. The topic may be determined by the messaging service 220, such as the chat service 222. The messaging service 220 may determine that a message comprises information indicative of a topic based on parsing the message and identifying a predetermined character being included in the message. By the way of example and without any limitation, the predetermined character may be a hash sign #. The messaging service 220 may determine whether any messages associated with the conversation that have been received contain a new topic by searching existing topics stored in the databases 260 (e.g., the topic database 236). Upon determining that the topic is new, the messaging service 220 may store the new topic into the databases 260 (e.g., topic database 236). Associations of the conversation and topic may also be determined and stored into the databases 260, such as the conversation database 230 and the topic database 236.

At 804, messages and indications of new topics may be output (e.g., pushed, sent). An indication of the new topic (e.g., new topic tag) may be sent by a push service (e.g., push service 224) to messaging applications (e.g., messaging applications 240) associated with the participants of the conversation for display. The messages associated with a topic may be output by the push service 224 of the messaging service 220 upon receiving a user input indicative of a selection of the topic. The messages and topic tags may be output to users of the messaging applications, such as via the conversation in the UI of the messaging application 240 operating on user devices 242. The messages and topic tags may be sent to user devices (e.g., user devices 242). The messages and topic tags may be sent to external email addresses that have been added to conversation.

At 805, a new participant A may be invited to join the conversation. The new participant A may be invited by an existing participant, such as by entering a user name, a group name, or an email address associated with the new participant A in an input field of the conversation. The messaging service 220 (e.g., chat service 222) may add the new participant A to the conversation. The messaging services (e.g., chat service 222) may store an association of the new participant A and the conversation in the databases 260, such as in the conversation database 230 and the user database 234.

At 806, a look-up may be performed of the existing participants in the conversation. The look-up may be performed by the messaging service 220, such as the chat service 222. The chat service 222 may send an indication of the determined participants in the conversation to the push service 224.

At 807, the existing participants in the conversation may be notified that the new participant A has been added to the conversation. The existing participants may be notified by the push service 224. Notifying the existing participants may include sending notifications to user devices of the existing participants (e.g., user devices 242). The existing participants may be notified via the conversation and/or the UI of the messaging application operating on their devices.

At 808, the content of a message associated with the conversation may be determined. The content may be parsed by the messaging service 220, such as the chat service 222. Parsing the content may include determining one or more attributes of the content of the message. For example, it may be determined that a message includes text comprising a special character denoting an attribute, such as a new participant A. By the way of example and without any limitation, the predetermined special character denoting a new user (i.e., new participant) may be an @ sign. A look-up of the conversation may be performed, such as by querying the databases 260, such as the conversation database 230 and topic database 236. The look-up of the conversation may be performed to determine users, messages, topics, and other attributes associated with the conversation. The chat service 222 may send an indication of the results of the parsing and/or the conversation look-up to the push service 224.

At 809, the results of the conversation look-up, such as messages and topic tags may be output (e.g., pushed) to the new participant A. The messages and topic tags may be output by the push service 224. Outputting the messages and topic tags may include sending the messages and topic tags to the new participant, such as via the conversation in the UI of the messaging application (e.g., messaging application 240) operating on a user device (e.g., user device 242). The messages and topic tag may be sent to a user device (e.g., user device 242) associated with the new participant A. The messages in the conversation may be sent to an external email address associated with the new participant A. The messaging service in accordance with the present disclosure may categorize conversations based on the attribute of topics associated with conversations and provide a participant content of a conversation in response to a selection of a topic tag indicative of the topic of the conversation in which the participant is interested. This allows the present message service to more efficiently provide the content of interest to users.

Figure 9:
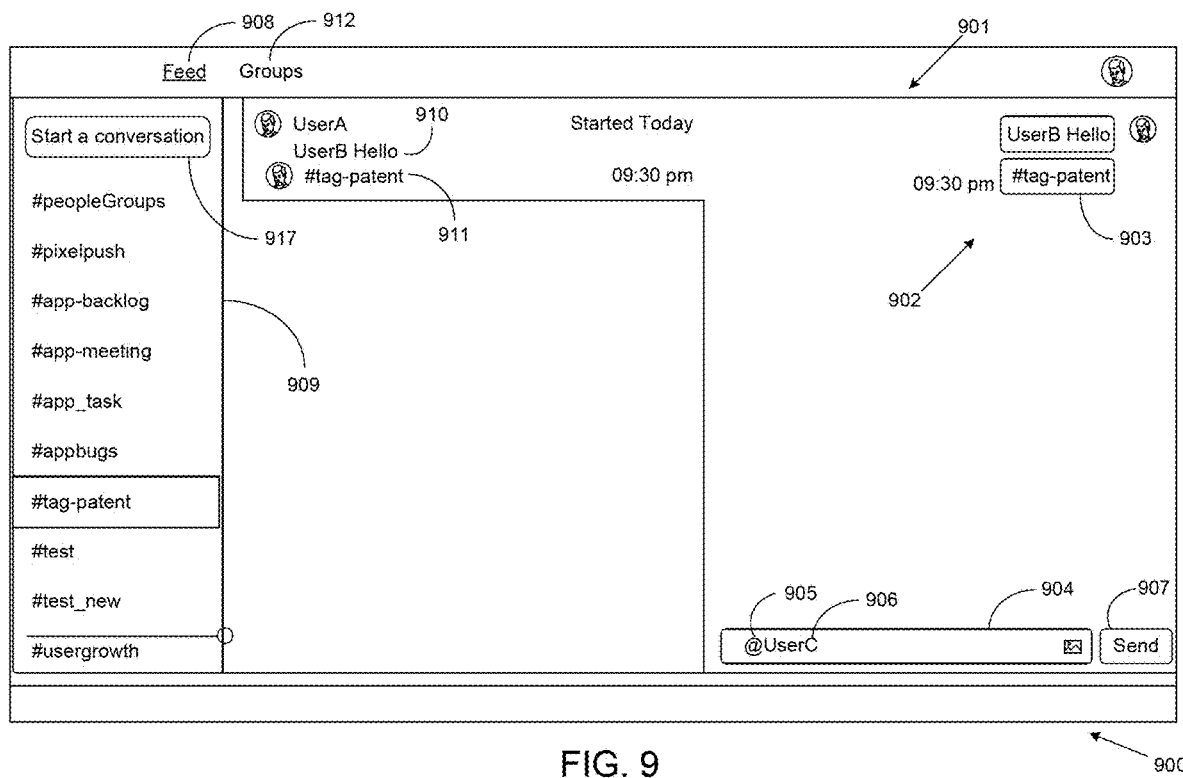
FIG. 9 shows an example user interface of a messaging application including a conversation.

FIG. 9 illustrates, in conjunction with FIG. 8, aspects of starting a new conversation and adding a user to the new conversation. As noted with respect to FIG. 4, the user begins a new conversation. The user can begin a new conversation by selecting the "Start a conversation" button 917. FIG. 9 illustrates this from the perspective of a user interface 900 operating on the user device (e.g., user device 242). Here, a user (e.g., User A) has started a conversation 901 and enter a message "#tag-patent" 903. Since there are no other users associated with the message 903, the message only appears in the conversation 901 for a single user, User A, who is also the creator of the conversation (i.e., creator user). In this way, the creator user can continue to add messages to the conversation 901. As explained more fully below, the "#tag-patent" message includes a topic ("patent") that was entered as at least a part of first message. A message including a topic can be entered anytime in a conversation. In an embodiment, it is processed by the messaging service and stored in the database as an attribute associated with the conversation 901. Likewise, as explained, other participants of the conversation 901 (e.g., users of the messaging service that have access permissions to the conversation 901) can also be added to the conversation 901 as attributes of the conversation 901.

Referring again to FIG. 8, the creator user of the conversation can invite a new user to participate in a conversation (i.e., new participant). In some embodiments, the messaging service uses a chat service 222 and a push service 224 as noted above, in communication with a plurality of databases 260 as discussed. Continuing with the example, a user may start a conversation at 810 comprising one or more messages. The messages may comprise a plurality of characters, symbols, be a text string, or other type of content. As new messages are added to the conversation, the chat service 222 determines which users are attributes of the conversation, i.e., users associated with the conversation. These attributes are stored in one or more databases. Such databases include, but are not limited to, a conversation database (e.g., conversation database 230), a group database (e.g., group database 232), and a topic database (e.g., topic database 236), and an email user database (e.g., email user database 237). Participants of the conversation are identified and may be notified of the conversation.

Once messages in a conversation are received, the messaging service (e.g., messaging service 220) may determine whether there are new topics included in the messages forming the conversation, and existing topics may be searched for in the one or more databases, such as the topic database 236. Accordingly, attributes of the conversation, e.g., topics, users, groups, etc., ensure that the conversation is properly categorized such as based on topics and that the new conversation is pushed out to the participants. Push service 224 assists in the output of messages, existing topic tags, and new topic tags to intended participants. In some embodiments, this may occur through pushing messages to a user interface or user display on a device associated with the intended participants of conversations.

In another example, a user may be invited to join a conversation. For example, new participant A may be invited to join an existing conversation at 805, which authorizes the messaging service (e.g. messaging service 220) to share information related to the conversation with new participant A. Chat service 222 processes this action, looks up all existing participants associated with the conversation at 506, similar to the prior example, and communicates with one or more databases 260 (e.g., databases 230-236) as needed to obtain related information. Once the participants are identified, push service 224 notifies the identified existing participants associated with the conversation, in order to indicate to the existing participants that a new participant has been added to the conversation at 807.

After the new participant A has been invited to join a conversation, messages, content, and/or metadata related to the conversation are retrieved from, e.g., the conversation database 230 and the topic database 236, so that the push service can transmit the relevant aspects of the conversation to the new participant. FIG. 9 illustrates an example user interface (UI) 900 of the aspects of techniques to invite a new user to participate in a conversation. In the FIG. 9, the UI 900 is shown such as would be presented on a user device (e.g., user device 242) through the messaging application (messaging application 240). In this instance and as shown in the UI 900, User A has started a conversation 901 comprising one or more messages 902. In this example, the message "Hello" has been added to the conversation 901. Moreover, another message including a topic "patent" 903 has been added to the conversation 901. That conversation 901 may be stored in the databases 260, e.g., the conversation database 230. In order to add a new user, information indicative of a user is typed into a message field 904 of the UI 900, using the @ symbol 905 or any other predetermined special characters followed by a text string 906 identifying the user by way of, e.g., a username. Here, the username of User C was entered into the text field prefaced by an @ sign.

In an embodiment, after the user selects the "Send" button 907, the message is sent to the messaging service (e.g., messaging service 220). The messaging service then parses the message to determine that the message contains the predetermined @ symbol 905 and interprets the subsequent text 906 of the message as user identifying information, as described for example in FIG. 4. The messaging service then interprets that message as a request by User A to authorize the system to add the identified User C (i.e., new participant) to the conversation. Other embodiments are also contemplated, for example, the messaging application on the user device could parse the message and send an indicator to the messaging service that the user wants to authorize the identified User C (i.e., new participant) to join the conversation. In other words, processing of the message could be done in part on the user device and part of the processing could be done by the messaging service.

In an event, once authorized, the cloud service could add information identifying the new participant (e.g., the user name of the new participant) as an attribute of the conversation. To that end, the user is associated with the conversation 901, and the association stored in the databases 260. It will be appreciated that a plurality of symbols, text, characters, etc., may be defined to be indicators associated with identifying a particular user. In this specific example, the @ sign was the predetermined symbol used for adding a new user and the user entered the new username as "@UserC," who was recognized by the messaging service as a new participant to the conversation 901.

Figure 10:
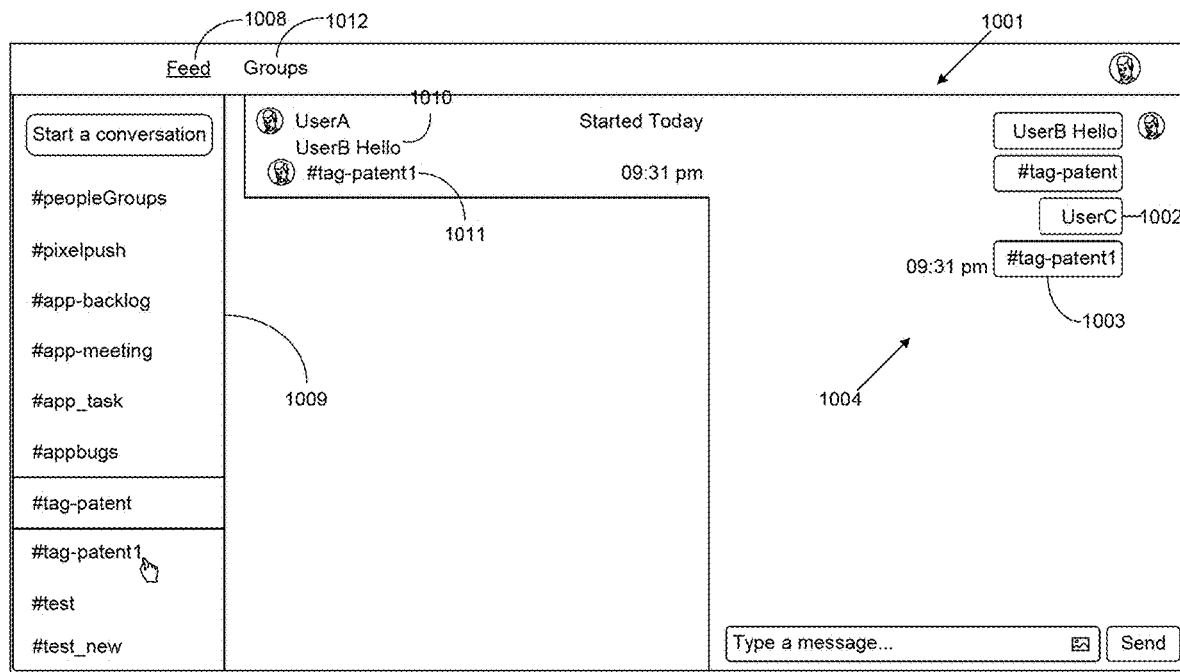
FIG. 10 shows an example user interface of a messaging application including a conversation.

FIG. 10 illustrates aspects of this feature from a UI 1000 perspective after the new participant 1002 (e.g., User C) was added to the conversation 1001. In this example, the username of the new participant 1002 becomes another message in the conversation 1001 as illustrated. In other words, the fact that a new participant was added to the conversation 1001 is preserved in the text of the conversation 1001 itself. Consequently, the order and time that new participants and other attributes are added to a conversation 1001 could be discerned by parsing messages in a conversation 1001. For example, the user (e.g., User A) also entered another message including a topic "#tag-patent1" to the conversation 1001 at 09:31 pm after adding new participant User C. Consequently, the user (e.g., User A) can add a new user to the conversation, designate one or more topics to be associated with the conversation 1001 by entering messages, e.g., "#tag-patent", "#tag-patent1." These particular messages in the conversation 1001 also become attributes of the conversation that are stored in various attribute databases, such as the topic database 236 the user database 234, and so on as shown in FIG. 2. In embodiments, attributes may be defined using different symbols, letters, characters, for example, using @ to indicate that a username or other user identification will be entered, and a hashtag, #, to indicate the topic to associate with the conversation 1001. It is contemplated that other symbols could be used for additional attributes to add to a conversation.

FIGS. 9-10 also illustrate that conversations may be sorted, for example, by topics, as indicated in the leftmost column 909, 1009. The depicted examples illustrate what is labeled as "Feed" view 908, 1008 wherein conversations are sorted by an attribute, such as the topic attribute. Selecting a feed will display a list of one or more conversations in a condensed version of the conversation and associated with the selected topic. In an embodiment, selecting a condensed version of the conversation will display the one or more messages associated with the selected conversation. Here for example, the condensed (or summary) of the conversation is shown with the creator of the conversation listed at the top followed by the initial message in the conversation, "UserB Hello" 910, 1010, followed by the last message in the conversation, which was the message "#tag-patent1" 911, 1011 for adding the second topic. The condensed (or summary) of the conversation shows a user a preview of the conversation, which allows a user to determine whether he/she is interested in the conversation and would like to review entire content of the conversation by selecting the summary of the conversation. The topics (shown as topic tags on the UI) serve as short descriptors of content of conversations.

In other embodiments, as discussed herein below, conversations may be sorted by one or more other categories and classifications, such as a "Groups" view 912, 1012, wherein conversations and messages are organized based on the groups to which each of those conversations and messages are directed. These will be further described below in other embodiments.

Figure 11:
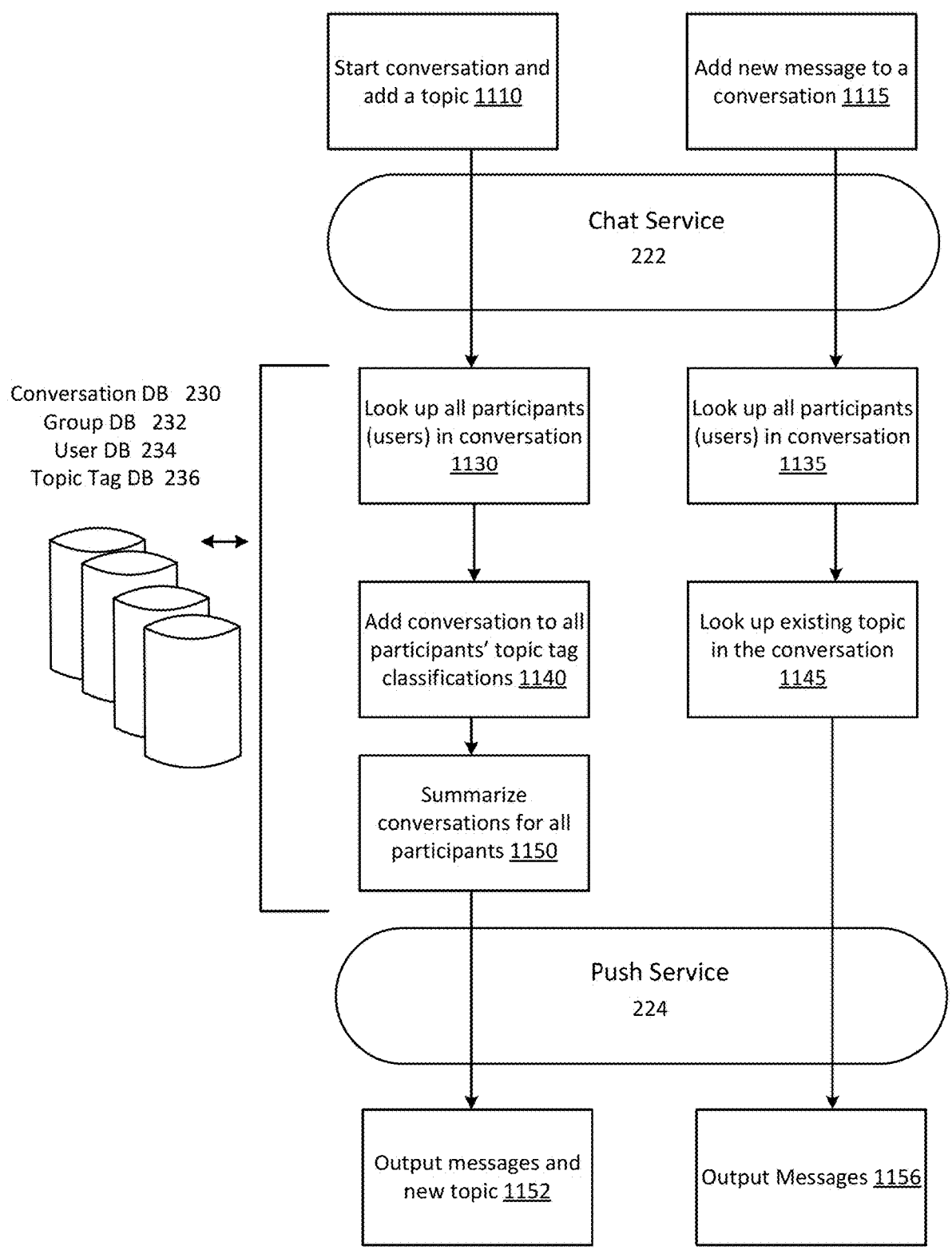
FIG. 11 shows an example technique for adding a topic to a conversation.

FIG. 11 illustrates embodiments for adding topic tags to a conversation and adding new messages to a conversation. As alluded to above, topic tags corresponding to topics are attributes of a conversation that are used, for example, in the Feed View to allow for easy sorting, management, and selection of conversations. One or more topics may be associated with a conversation by way of such topic tags. By the way of example and without any limitation, a topic tag may be a text string with a leading character indicating that the subsequent text contains a topic. In this embodiment, the hash symbol or "#" is the predetermined character recognized by the messaging service to denote a topic. A user (i.e., participant) may start a conversation. In this example, the user also adds a topic at 1110 to the conversation. Chat service 222 then receives the indication of a new conversation and may parse messages to detect the existence of the topic. As noted early in the description, the parsing of the messages may be done by the messaging service (e.g., messaging service 220), by the messaging application (e.g., messaging application 240) on the user device (e.g., user device 242), or some combination of both. After a conversation is started by entering a message, such as a message comprising a topic, a lookup 830 occurs to determine whether any other users, i.e. participants are associated attributes of the conversation. The look up can occur through one or more searches of databases 260, such as the conversation database 230, group database 232, user database 234, and topic database 236.

Once relevant users (i.e., participants of a conversation) are identified, the conversation is added to all participants' topic tag classifications at 840 that are stored and tracked in the various databases. In other words, an association may be stored between the new conversation and the designated topic tag, and an association may be stored associating all users associated with the topic tag who are also associated with the conversation. Consequently, conversations are summarized for all participants 1150 in connection with the topic tag. For example, where users are added to the conversation, the users may receive a condensed version of the topic consisting of the first and last messages. A push service 224 can further process such messages and allow the messages to be output at 1152, e.g., on a user display, sent to respective users, and update respective views for existing tags and new tags, for example in Feed Views of conversations sorted by such tags.

In another embodiment, illustrated in FIG. 11, the topic tag features are incorporated into existing conversations. For example, at 1115, a new message comprising an indication of a topic can be added to an existing conversation. Similar to the prior described process, receiving a message comprising information indicative of the topic results in a look up for all participants in the conversation at 1135. An association between the topic and the conversation, and associations between the participants and the topic may be stored in the databases 260, such as the conversation database 230, the topic database 236, the user database 234, the group database 232, and the email user database 237. At 1145, a look up for other existing topic tags can occur to determine whether the topic is new, for example, if there were multiple topic tags existing within and associated with the conversation. At 1156, the messaging service 220, e.g., the push service 224 then push the message and the new topic tag corresponding to the new topic, to respective participants.

Figure 13:
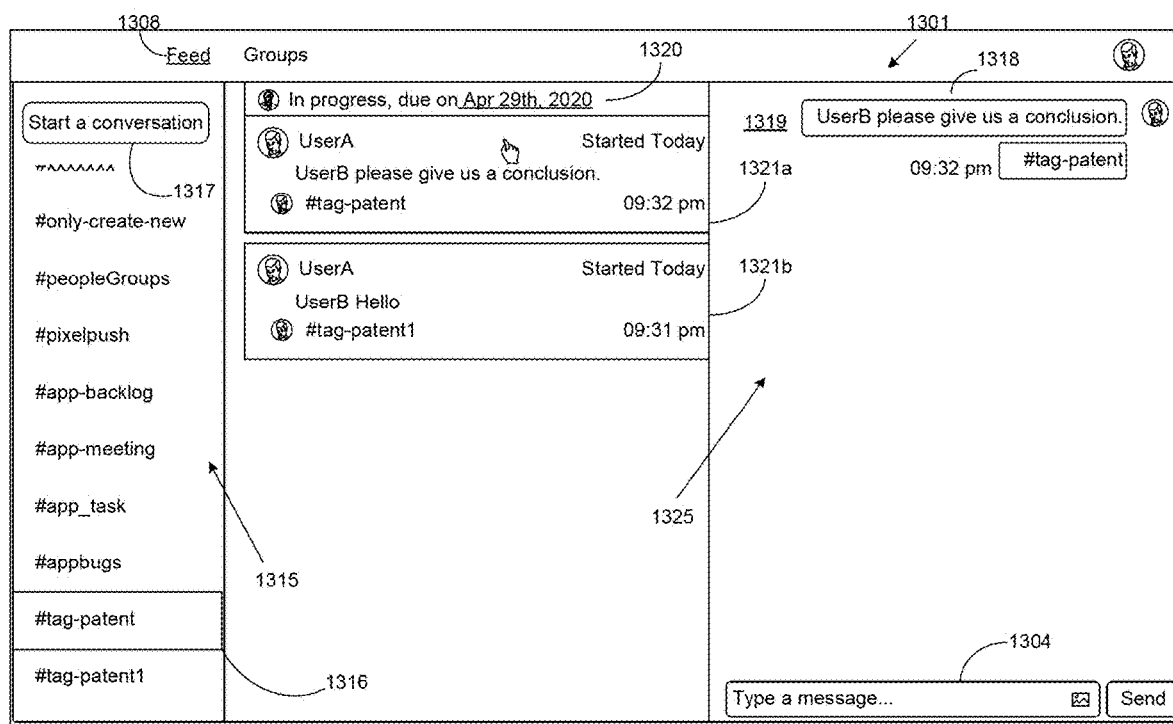
FIG. 13 shows an example user interface of a messaging application in which conversations may be sorted by topic tags.

Examples of these techniques are illustrated through the user interface examples of FIGS. 12-13. FIG. 12 illustrates a Feed view 1208 of an example messaging application, providing a list of topic tags 1215. In this example, a conversation 1201 comprising a message "#tag-patent" that includes a topic prefaced by a predetermined character "#." As noted above, the predetermined character denoting a topic may be any other special characters, such as % sign. When the message is determined by the messaging service to include a new topic based on determining that the message includes the predetermined character # and searching the databases 260, the conversation is added to the list of conversations associated with the new topic. Thus, when the corresponding topic tag is selected from the Feed view 1208 via the UI of the messaging application (e.g., messaging application 240), the current conversation 1201, as well as all other conversations associated with the new topic may be readily viewed and organized by all participants of the conversations.

FIG. 13 further illustrates this concept, as well as the ability to sort conversations based on the topic. Here, the user has selected the topic tag "#tag-patent" 1316 in the leftmost column 1315 of the UI 1300. That causes the messaging service to push the condensed version of each conversation that is related to the user and the selected topic. The selection of the topic tag "#tag-patent" 1316 also causes the messaging service to push content of the corresponding conversation for display of the messages in the conversation in the rightmost area 1325 of the UI 1300. Those conversation are then displayed in the Feed view 1308 without displaying other unrelated conversations. The order of the topic tags displayed in the Feed view 1308 may be arranged according to user preference, such as a priority or importance of each topic. Conversations associated with each topic tag may also be sorted based on one or more variables, such as time, last message received, priority, user preference, and so forth. Again, each conversation comprises a plurality of messages, and users associated with that particular conversation may view messages, send messages, and add attributes, such as additional users, topics, groups, etc. as discussed herein.

In various embodiments, a user may generate a conversation comprising one or more messages that may include attributes. Messages may be parsed, and a determination made that a message comprises a string indicative of attributes, such as a user, topic, group, etc., based upon one or more messages being parsed. The attributes may be stored in at least one database as an association between the information indicative of topics and conversations. In response to receiving an input indicative of a selection of a topic from the messaging application (e.g., messaging application 240), at least a subset of a conversation associated with the topic is sent by the messaging service (e.g., messaging service 220) to the messaging application 240 for display.

In additional embodiments, a messaging service can further determine that the topic is new by searching the at least one database, the at least one database comprising information related to topics and store in the at least one database information indicative of the topic based upon the determination that the topic is new. In another example, a second message in the conversation may be parsed. A determination may be made that the second message comprises information identifying a second user and consequently authorize the second user to add messages to the conversation. Information indicative of the topic may be sent to one or more messaging applications, e.g., operated by one or more other users, and a database can store a plurality of conversations, in addition to a plurality of attributes, e.g., topics, associated with each conversation.

One or more features and functions may occur through the use of a messaging service, which may comprise at least one database, at least one computing device in communication with the at least one database and the at least one computing device is configured to perform operations. In addition, various aspects of processing can be split between a messaging application and a messaging service. In some embodiments it may be preferable to have the messaging app perform operations and in other embodiments the same operations may be performed by the service.

In the Feed view 1308, conversations may be initiated, such as by selecting an icon, such as a "Start a Conversation" icon 1317. Unlike other messaging applications, the conversations may be organized by topic rather than only by users. Topics may be defined by users at the beginning of a conversation. For example, a creator user who initiates a conversation 1301 may assign a topic to the conversation 1301. Topics may also be defined by other participants at other stages of the conversation. The topic may be denoted by use of a special character or tag, such as "#" symbol. The creator user may then add other participants to the conversation or may carry on a conversation alone.

In the "Feed" view 1308, one or more panels 1315, 1318, 1320, may be displayed. The panels may comprise an open (e.g., expanded) conversation panel 1318. Participants may communicate in the open conversation panel 1318, such as by entering messages in an input field 1304. The entered messages may appear as a log or feed 1319 of the conversation 1301, such as in the order in which they were sent, entered, or received. A time stamp may be displayed near messages in the conversation 1301 to indicate a time that the messages were sent, entered, or received. The username of the participant that entered a message may appear alongside the message in the conversation.

The panels may comprise a collapsed conversation panel 1320. The collapsed conversation panel 1320 may be adjacent to the open conversation panel 1318. The collapsed conversation panel 1320 may show previews 1321a, 1321b of conversations, such as a first message of the conversation, a title of the conversation, a last message of the conversation, and/or a number of unread messages in the conversation.

FIGS. 14-19 illustrate aspects of interactions between participants in the context of a group (e.g., group of users), and various techniques and embodiments in which messaging services and applications may classify, organize, and output messages and conversations related to groups. It should be appreciated that FIGS. 14-19 are merely illustrative, and a group may be created and join conversations in other suitable manners.

Figure 14:
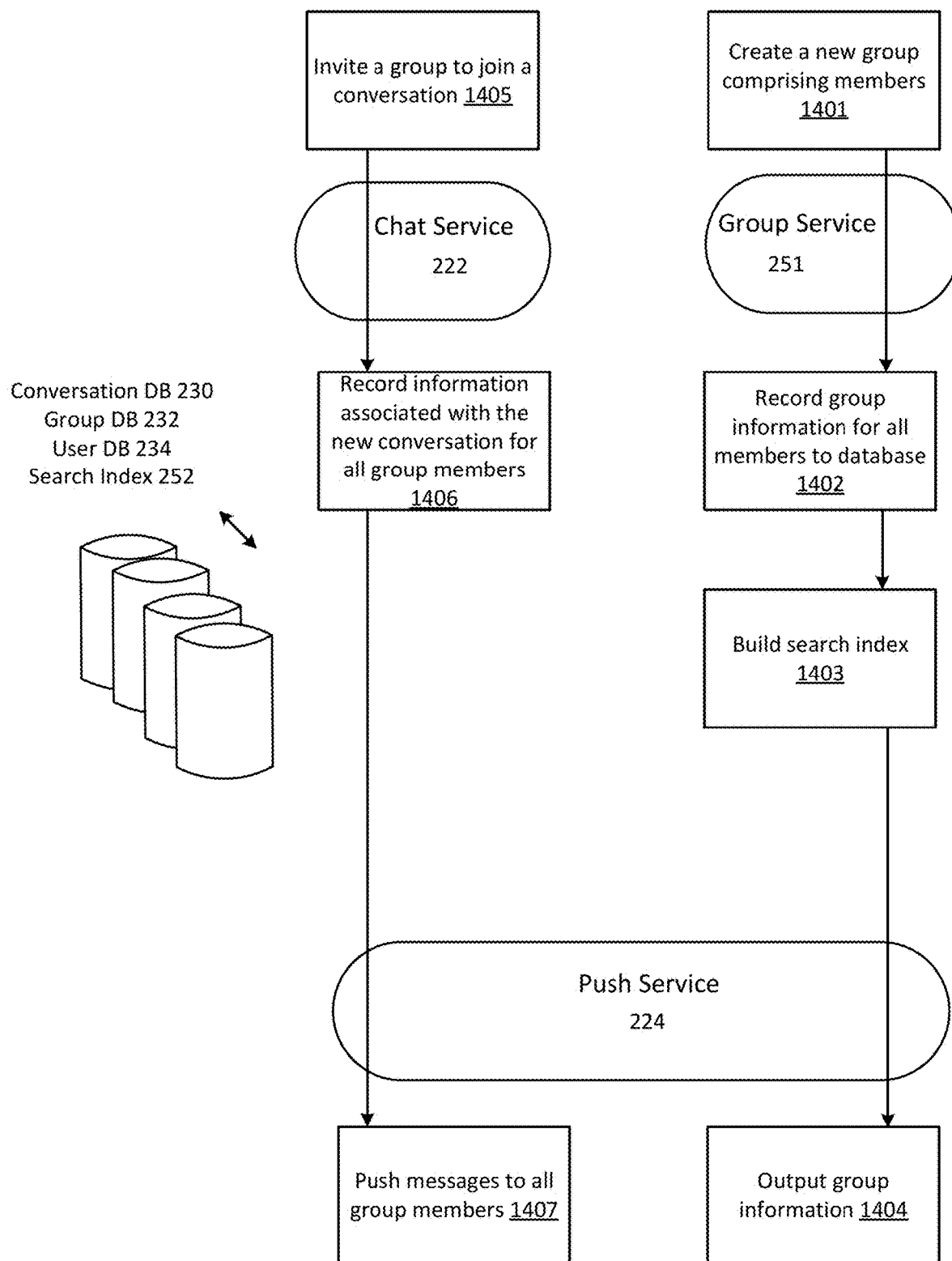
FIG. 14 shows an example technique for creating a group and inviting members.

FIG. 14 illustrates aspects for inviting existing or newly created groups into conversations and creating new groups. At 1405, an existing or a newly created group may be invited to join any conversations. By way of example and without limitation, the group comprising multiple members, as an attribute, can be invited to join and authorized to participate in multiple conversations. The group attribute also allows a same conversation to have multiple group participants. Additionally, a group participant to a conversation enables the content of the conversation to be pushed to all members of the group at once. Thus, the present messaging service provides more flexibility and efficiency than existing messaging systems.

The group can be invited by a participant of any conversation by searching for the group name of the group. By way of example and without limitation, in response to receiving a user input indicating to invite the group to the conversation, the messaging service stores an association between the group and the conversation into the database bases 260, such as the conversation database 230 and the group database 232.

At 1406, information associated with the conversation can be recorded for all members of the group in the databases 260, such as the group database 232 and the search index database 252. The information associated with the conversation can include messages in the conversation, attributes of the conversation, and any other information associated with the conversation. The information associated with the conversation can be sent to the push service 224.

At 1407, at least a subset of messages in the conversation are pushed to all of the members of the group after the group is invited to participate in a conversation. The messages can be pushed by the push service 224. Pushing the messages can include sending the messages to the members, such as to their devices. Pushing the messages can include causing the messages to be displayed in the UI of the messaging applications associated with the members.

FIG. 16 illustrates aspects of the Group view 1600 in a UI of the messaging application. In the Group view 1600, groups to which a user belongs are displayed to the user. FIG. 16 lists 8 groups to which a user belongs. According to embodiments, the groups are displayed in a list. The group display shows attributes of the groups and one or more selectable interface elements (e.g., selectable buttons "Edit" and "Delete"). The attributes include group names 1601. FIG. 16 shows group names including "Group1, "Group 2," "Group 3," etc. The information associated with the group is sent to the messaging service (e.g., messaging service 220) and maintained in the databases 260 (e.g., the group database 232, the search index database 252, etc.) by the messaging service 220.

Once the group is authorized to participant a conversation, an association between the group and the conversation will be stored in the databases 260. For example, the messaging service 220 stores the thread identification (ID) of the conversation and the group identification (ID) of the group in the group database 232. By way of example and without limitation, the association between the group and the conversation can be identified based on the thread ID of the conversation and the group ID. The messaging service may generate a search index based on the information associated with the group and store the search index in the databases 260, such as the search index database 252. Associations between all members of the group and the conversation may be determined based on the search index, and the associations may be storied in the databases 260. The information associated with the group and members of the group may be retrieved from the databases 260 so that messages in the conversation may be sent to the messaging applications for display associated with all members of the group (that is a group participant of the conversation) based on the retrieved information.

After the group is invited to participate in a conversation (i.e., as a group participant), identification information of individual members of the group may not be sent to messaging applications associated with the participants of the conversation for display unless any particular individual member is invited to the conversation by other participants or directly participates in the conversation (e.g., posting messages in the conversation). If any particular individual member of the group is invited to the conversation by other participants or directly participates in the conversation, the identification information of the particular individual member is sent to the messaging applications associated with the participants of the conversation for display of the identification information of the particular individual member; moreover, the particular individual member may continue to participate in the conversation as an individual participant even after the group is removed from the conversation. Any other members of the group who have not been invited to the conversation by other participants or directly participated in the conversation will not receive any further messages in the conversation after the group is removed from the conversation or after the individual members are removed from the group.

As further described below, a member may be added to a group or removed from a group. Upon receiving information indicative of editing a group (e.g., adding or removing a member), the messaging service (e.g., messaging service 220) updates the databases 260 (e.g., group database 232 and search index database 252). The messaging service 220 searches the databases 260 to determine which members are currently included in the group and sends to the members currently in the group any message in a conversation which the group participates in as a group participant. If any former individual member of the group had been invited to the conversation by other participants or directly participated in the conversation before this individual member is removed from the group, this former individual member may continue participant in the conversation as an individual participant; the messaging service 220 may continue to send messages in the conversation to this former individual member currently as an individual participant.

The attributes of a group may include group privacy settings 1602. As shown in FIG. 16, the Group "Group 1" is private. The Group "Group 2" is also private. Privacy settings may also be maintained in the database 260, such as the group database 232. For any private group, the private group are accessible to the members of the private group only. Unlike a private group, a public group are not limited to the members of the group. Instead, public groups are accessible to any participants of the conversation or at least a subset of other users registered with the messaging service (e.g., messaging service 220).

The attributes of a group may also include people 1603 (e.g., members of the groups). FIG. 16 shows the "Group 1" group having 10 members. The "Group 2" has three members. In the Group view, the members of each group may be represented by their profile pictures, account avatars, usernames, and/or handles, as examples, which may be maintained in the user devices (such as user device 242) and/or in the databases 260 of the messaging service 220.

The Group view includes features for a user to manage their groups. In addition to the feature of creating a new group as described above and particularly shown in FIG. 15, the features may include actions 1605. The actions 1605 include an "edit" option that enables a user to change attributes, such as name, privacy setting, and members of a group (e.g., adding or removing members). In response to a user selecting the edit option, a window, such as one similar to the window 1203 in FIG. 12 is displayed. The window includes an option to add or remove members. The actions 1605 may further include a "delete" option that enables a user to delete a group.

By way of example and without limitation, a new group may be created at 1401. The new group comprises a plurality of members. The group can be created by a group service 251 of the messaging service 220. The messaging service 220 may also create a group ID for the new group. The group can be created based on a user input. The user input may be received via a Group view of the UI of the messaging application, such as the Groups view 1501 in FIG. 15. A user may toggle from the Feed view 1502 to the Groups view 1501. In the Group view, a participant of a conversation may select a "New Group" icon 1507. In response to the user's selecting the icon 1507, a UI (e.g., window 1503) with options for creating a new group is displayed. A new group may be created via the UI (e.g., window 1503).

The options include a privacy setting 1504. The privacy setting 1504 is selected by selecting an icon 1508, such as a slidable icon or toggle-able icon, with privacy options. In embodiments, a private group is not searchable by other users across the messaging platform. In other embodiments, non-private groups are found and thus added to various conversations, associated with attributes, etc.

Figure 15:
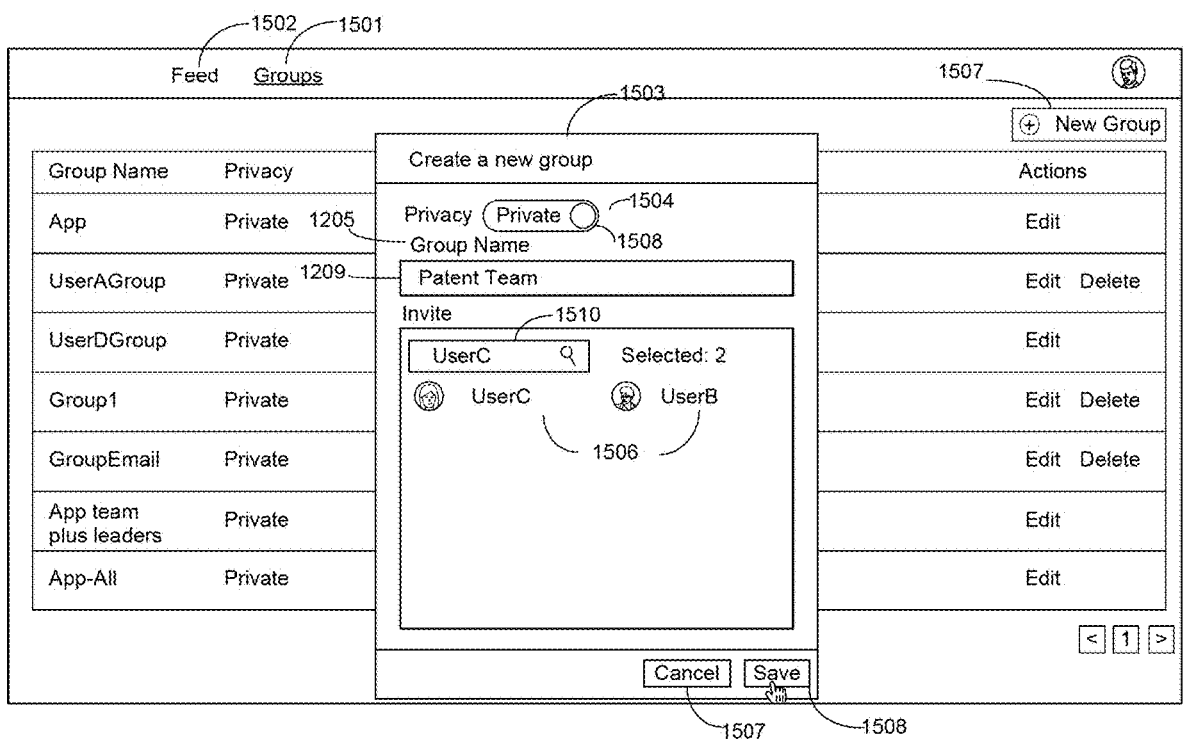
FIG. 15 shows an example user interface of a messaging application in which a new group may be created.

The options include a group name 1505. The group name 1505 is entered by entering a string of text in an input field 1509. As shown in FIG. 15, a group name "Patent Team" is entered in the input field 1509. The group name 1505 distinguishes the group from other groups. The group can be searched by its group name 1505.

The options include users (i.e., members) 1506 in the group. FIG. 15 shows Patent Team group having five members. The members 1506 in the group are invited (e.g., added) by searching for information identifying the members 1506. By the way of example and without any limitation, the information identifying the members 1506 of the group may comprise a user name associated with any member, an account in an entity associated with any member, an email address associated with any member, or a phone number associated with any member). Upon receiving identification information of the members of the group, the messaging service 220 may store the identification information of the members into the databases 260, such as the group database 232 and the search index database 252.

The members 1506 are added by entering a string of text in an input field 1510. For example, FIG. 15 shows searching for a member named "User C" to invite to the "Patent Team" group. The window shows a number 1511 of members that have been selected to be invited to the group. The options selected in the window become attributes and/or associations of the group.

The group may be cancelled by selecting a "Cancel" button 1507 in the UI. The group may be saved by selecting a "Save" button 1508 in the UI. In response to the group being saved, the attributes and associations of the group may be saved to a database.

Referring back to FIG. 14, at 1402, group information (e.g., attributes, associations) are recorded (e.g., saved, stored) to one or more databases 260, such as the group database 232 in FIG. 2. The group information can be recorded by the group service 251. The database can include the conversation database 230, the group database 232, the user database 234, and/or the search index database 252.

At 1403, a search index is built for storing indexes of searching information. The search index can be built by the group service 251. The search index can operate in conjunction with other databases, such as the conversation database 230, the topic database 236, the group database 232, and the user database 234. The search index allows the messaging service to search for attributes (e.g., group attribute) associated with messages and conversations. The search index allows management of access permissions. Based on the search index, group members have access to certain conversations and messages.

At 1404, information associated with the group may be output to the messaging applications associated with the participants of the conversation for display. Outputting the group information can include sending an indication of the group to the participants, such as to their devices. Outputting the group information can include causing the group information to be displayed via the UI of the messaging applications, as shown in FIG. 16.

Figure 17:
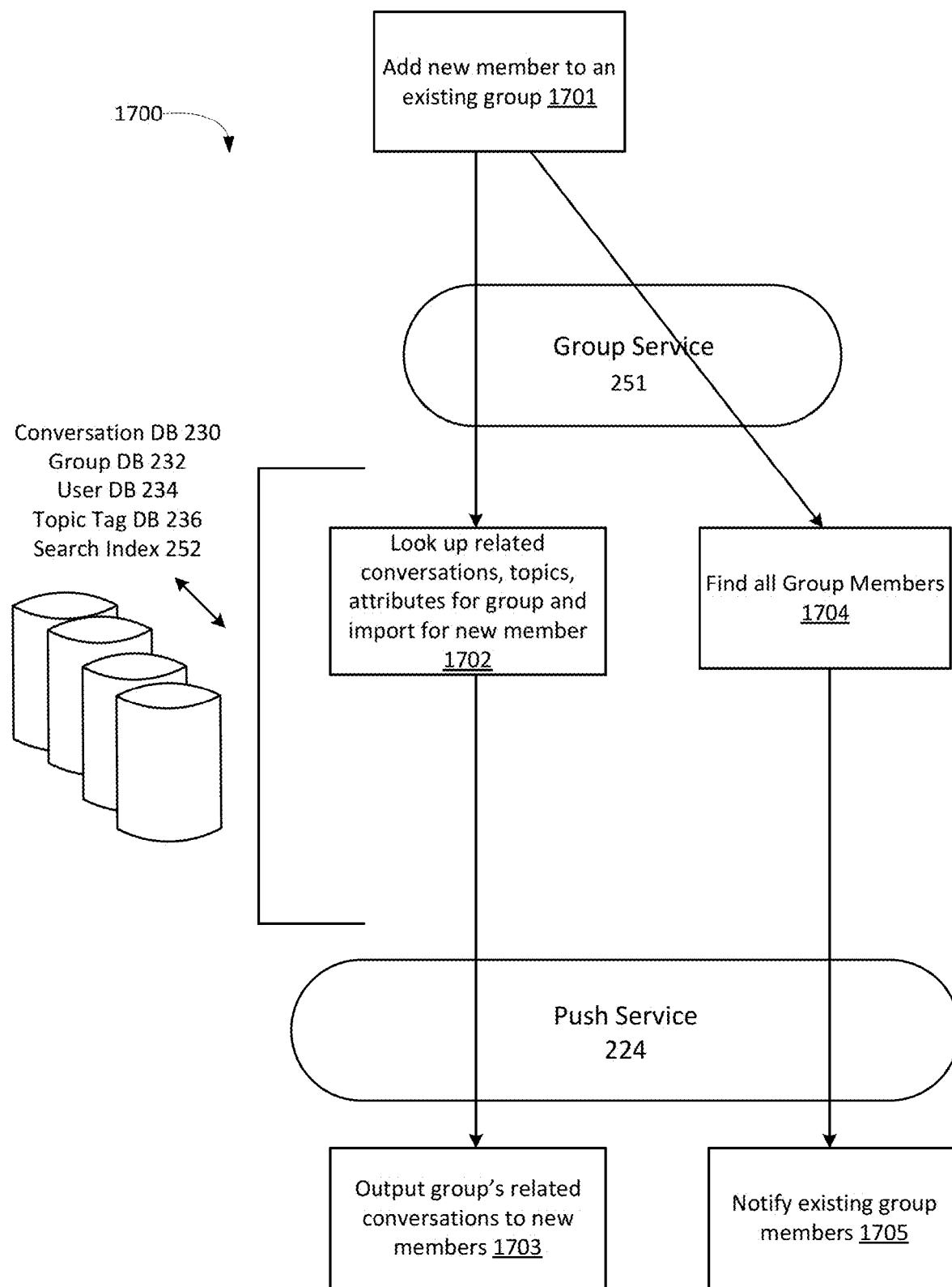
FIG. 17 shows an example technique for adding new member to an existing group.

FIG. 17 illustrates aspects 1700 for adding a new member to an existing group. At 1701, a new member is added to an existing group. The new member can be added to the existing group in response to receiving a user input. A user may enter the input by selecting one of the "edit" icons in the Group View of the UI. A window may be displayed with a list of current members to the group. The user may search for the name of a user that is not a member to the group and select to invite the new member to the group.

A group service 251 of the messaging service may add the new member to the existing group. The group service 251 may add the new member based on receiving the user input. The group service 251 may save an association of the new member and the group to one or more databases 260. The databases 260 may include the conversation database 230, the group database 232, the user database 234, the topic database 236, and/or the search index database 252, as examples.

At 1702, a look-up is performed for information related to the group such as associated conversations, topic tags, etc. The group attributes include such things as existing group members. The look-up is performed by sending queries to one or more databases 260. The attributes are imported for the new member. Importing the attributes may include saving the attributes locally, such as to a memory of the group service 251 and saving the new member attributes to group database 232.

At 1703, the conversations associated with the group are output to the new member. The conversations can be output by the push service 224. Outputting the conversations can include sending messages included in various conversations associated with the group to the new member, such as to a device of the new member. Outputting the conversations can include causing the conversations to be displayed via the UI of the messaging application to the new member.

At 1704, members of the group are found. The members of the group can be found by the group service 251 and/or the push service 224. The members of the group can be found by querying the databases 260. The group service 251 can determine the members of the group and send an indication of the members to the push service 224.

At 1705, existing members of the group are notified of the determined members of the group. The members can be notified by the push service 224. The members can be notified that the new member has been added. Notifying the members can include sending a notification to the members, such as to their devices. Notifying the members can include causing the members of the group to be displayed to the members via the UI of the messaging application, such as in the Group View.

In some embodiments, the messaging service 220 and/or the messaging application 240 may receive a message in conversations that include information for specifying a group comprising a plurality of members. In response to receiving the information, the messaging service 220 may query the databases 260 and send at least a subset of the messages in the conversation to the messaging applications 240 associated with the members of the group for display of the at least a subset of the messages in the conversation. In an example, the messaging service 220 and/or the messaging application 240 may acquire information associated with the members of the group by analyzing data associated with the group. In an example, the data associated with the group comprise information of the members and attributes of the group. In another example, the data associated with group may further comprise at least of a part of content of the conversation in which the group participates.

Figure 18:
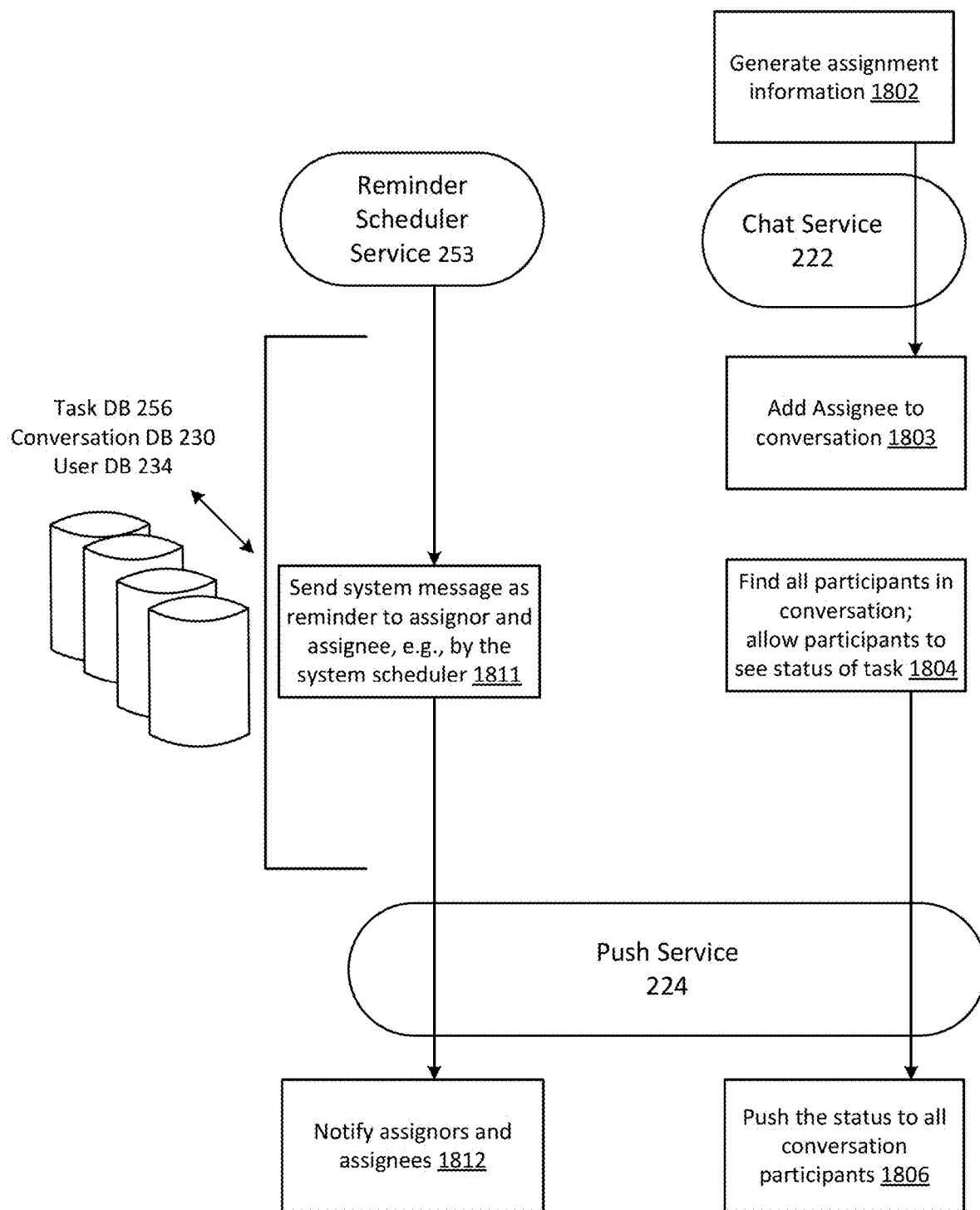
FIG. 18 shows an example technique for assigning and managing tasks using a messaging service.
Figure 19:
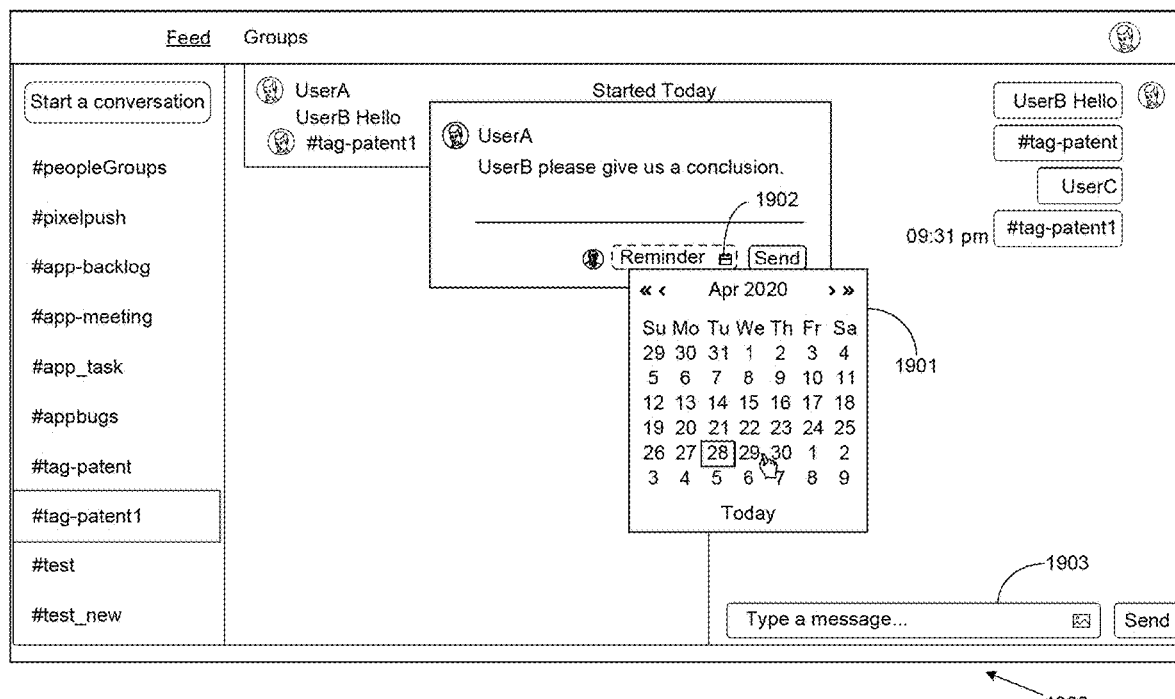
FIG. 19 shows an example user interface of a messaging application in which a reminder date may be scheduled.

According to yet another aspect, a task associated with a due date may be created and assigned by one participant (assignor user) to another participant (assignee user) within a conversation. FIGS. 18 and 19 illustrate techniques for assigning a task associated with a due date within a conversation. The messaging service includes a chat service 222. The chat service 222 can be provided by a device or a program, such as in the cloud computing network 100 in FIG. 1. The chat service 222 enables users of the messaging service to exchange messages in a conversation and/or to generate conversations.

A task is initiated when the chat service 222 receives an input from a user. In some embodiments, the task may be first edited by the assignor user via the messaging application (e.g., messaging application 240), and then the assignee user is invited to join the conversation so as to assign the task to the assignee user. In other embodiments, the editing of the task and inviting the assignee user for assigning the task may be performed at the same time on the same UI of the messaging application associated with the assignor user. The chat service 222 can receive the input via a conversation, such as via an input field of the conversation in the UI of the messaging application on a user device.

To illustrate, FIG. 19 shows the UI 1900 of the messaging application in the Feed view, in which a user can enter an input in the input field 1903. The user can be a creator user of a conversation or other participant to the conversation. The input is a string of text. For example, in FIG. 19, the user "User A" is inputting a string of text "User B Please give us a conclusion." The text may describe a task. For example, the User A's text includes "Please give us a conclusion," wherein the task is "giving a conclusion." The text can include an indication of another user, such as a user to whom the task is assigned. For example, User A's text includes the name of another user, User B. The user identified in the input can be user registered with the messaging service (e.g., messaging service 220) and participating in the conversation. The user identified in the input may not be an entity external to the messaging service (e.g., messaging service 220), such as an email participant to the conversation that will be further described below. In this example, User A is an assignor user, and Use B is an assignee user.

The input can include a date associated with the message. The date can be a due date for the task. The date can be a date on which a reminder should be sent regarding the task. The date can comprise a selection of an icon output via the UI of the messaging application on a user device. The icon may represent a calendar, such as the icon 1601 in FIG. 16.

Referring back to FIG. 18, at 1802, assignment information is generated based on the input. The chat service 222 can generate the assignment information. The assignment information can include an association between the user assigning the task, the user being assigned the task, the message and/or task, and/or the due date. The assignment information is stored to one or more databases 260, such as a task database 256, a conversation database 230, and a user database 234. The chat service 222 can store the assignment information.

At 1803, based on the assignment information, an assignor attribute and/or an assignee attribute is added to the conversation. The chat service 222 can add the attributes. Adding the attributes can include storing an association between the assignor user, the assignee user, the message and/or task, the due date, and/or the conversation. The attributes are stored into the databases 260, such as the conversation database 230, the task database 256, the user database 234, and the group database 232.

According to embodiments, the task has a status. The status is based on the due date of the task and/or an attribute describing what stage of completion the task is in. For example, when the task and/or due date is generated, the status may be set to "open," "incomplete," and/or "unverified." The descriptive attribute of the status may be a pre-filled selectable input in the UI, such as a selectable icon or list of selectable icons. The descriptive attribute may be a string of text input by a user, such as in an input field of the UI of the messaging application.

The assignor user and/or the assignee user may change the status, such as to "closed," "completed," and/or "verified." The status may be changed based on whether the task has been completed. For example, if the task has been completed, the status may be changed to "done." The status is saved in association with the task and/or or due dates in the databases 260. In response to the status changing, the new status is saved to the databases 260. The messaging service 220 (e.g., chat service 222) can determine and store the status, timestamps (e.g., verified time, last updated time, etc.), and other information in the database 260 (e.g., the task database 256). In response to the status changing, notifications are sent to users. According to embodiments, the status is displayed to the assignor user, the assignee user, and/or participants to the conversation, such as in the conversation in the UI of the messaging application on user devices. Upon receiving information indicative of a status and a due date of the task, the messaging application may display the status and the due date of the task.

At 1804, all participants in the conversation are found. The chat service 222 can find the participants. The participants in the conversation may be determined by querying the databases 260. The participants can be sent to a push service 224 of the messaging service. The push service 224 can be a device or program of the messaging service.

At 1806, the status of the task is pushed to the determined participants of the conversation. The push service 224 can push the status. Pushing the status can include sending the status to devices of the participants (e.g., user devices 242). Pushing the status can include displaying the status in the conversation via the UI of the messaging application (e.g., messaging application 240) on user devices (messaging application 242). The messaging service (e.g., messaging service 220) may update the status of the task upon receiving information indicative of a change to the due date or the status of the task, such as from the assignor user and the assignee user. The messaging service will then send information indicative of an updated status of the task to user devices associated with the participants for displaying the updated status of the task.

According to embodiments, the messaging service includes a reminder scheduler service 253. The reminder scheduler service 253 can be a device or program of the messaging service. The reminder scheduler service 253 has access to the databases 260 of the messaging service. The reminder scheduler service 253 determines an assigned task, a conversation associated with the task, and one or more users associated with the task.

The user (e.g., User A) may enter an input indicative of a reminder date. As shown in FIG. 19, the user can enter an input via the UI 1900 of the messaging application indicating a date by which to send a reminder. For example, the User A selects a date selection icon 1902. Based on the selection of the date selection icon 1902, a window with selectable dates 1901 is displayed. The window 1901 can represent a calendar, showing days and months in a year. The User A selects a reminder date of Apr. 28, 2020 in the window 1901. Based on the user inputting a reminder date, the reminder date is sent to and stored in association with the task and/or due date in the databases 260, such as the task database 256 as shown in FIG. 15, such as by the reminder scheduler service 253 of the messaging service 220.

The reminder scheduler service 253 can determine if the status of the task and/or due date has changed. The reminder scheduler service 253 can determine if the status of the task has changed by querying the databases 260 to determine the current descriptive attribute assigned to the task and/or the due date and if the due date has lapsed. Based on the status changing to a "closed," "complete," and/or "verified" status, the reminder scheduler service 253 does not send the reminder. At 1811, based on the status of the task not changing or remaining "open," "incomplete," or "unverified," a reminder of the task and/or due date is sent by the reminder scheduler service 253. The reminder is sent to the assignor user, the assignee user, another participants of the conversation. The message can be sent to the push service 224. An indication of a change of the status is sent to the push service 224.

At 1812, the push service 224 receives the message from the reminder scheduler service 253. The messaging service 220 (e.g., push service 224) notifies and/or reminds the assignor user and/or the assignee user of the due date and/or the task. The messaging service may also notify or remind other participants of the due date and/or the task. The push service 224 notifies the assignor user, assignee user, and other participants of the reminder and/or of a change of the status to the due date and/or task. According to some embodiments, the push service 224 notifies the participants by sending messages to devices associated with the users. According to an aspect, the push service 224 may send the reminders at predetermined time periods, such as one week before a due date, two weeks before a due date, a day before a due date, an hour before a due date, etc. The push service 224 may notify the participants by causing a reminder to appear in the UI output via the devices of the participants. The push service 224 may cease providing reminders based on the status of the due date and/or task changing. The feature of assigning and reminding tasks enables the messaging service in accordance with the present disclosure to provide more functionalities than conventional messaging systems.

A user can respond to another user's changing the status. For example, an assignor user responds to an assignee user marking a task as "done," by marking the task "verified" to show that the user verified that the task is completed. The assignor user can reopen a tasked marked "done," such as if the user finds that the task has not been performed satisfactorily or determines that further work is needed. According to embodiments, based on the status changing, a color or other indicators of the due date and/or task, as displayed in the UI, changes. Based on the status changing, an indication of the change is sent to the participants of the conversation, such as by the push service 224.

In some embodiments, the messaging application 240 may receive information associated with a task in a conversation. The information comprises an identifier for identifying a user (e.g., assignee), content of a task, and information indicative of a date. The messaging application 240 may send the information associated with the task to the messaging service 220. Upon receiving the information from the messaging application 240, the messaging service 220 may send the information to the identified user (e.g., assignee). The messaging application 240 may further receive information indicative of an update of the status of the task and display the updated status of the task. The content of the task may comprise at least a part of content of the conversation.

Figure 20:
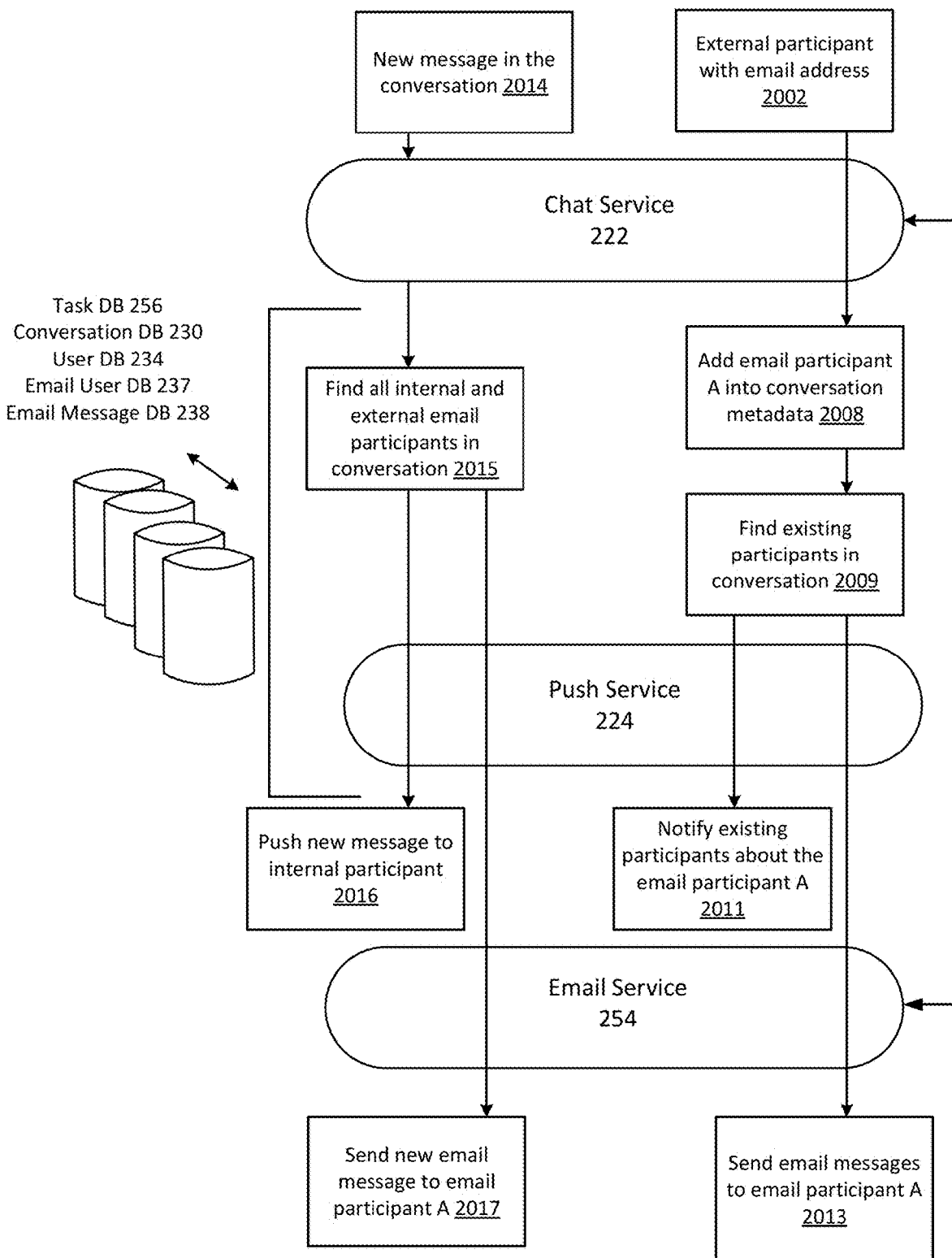
FIG. 20 shows an example technique for integrating an email service and a messaging service.

According to an embodiment, the messaging service 220 merges features of chat and email with email integration features. FIG. 20 shows an example chat and email integration process of the messaging service. The messaging service in accordance of the present disclosure implements an integration of email and messaging services, which improves the efficiency of exchanging information. As shown, the messaging service (e.g., the messaging service 220) includes a chat service 222. The chat service 222 may be an independent service or incorporated as features of the messaging service 220. The chat service 222 manages conversations in the messaging service 220.

Figure 21:
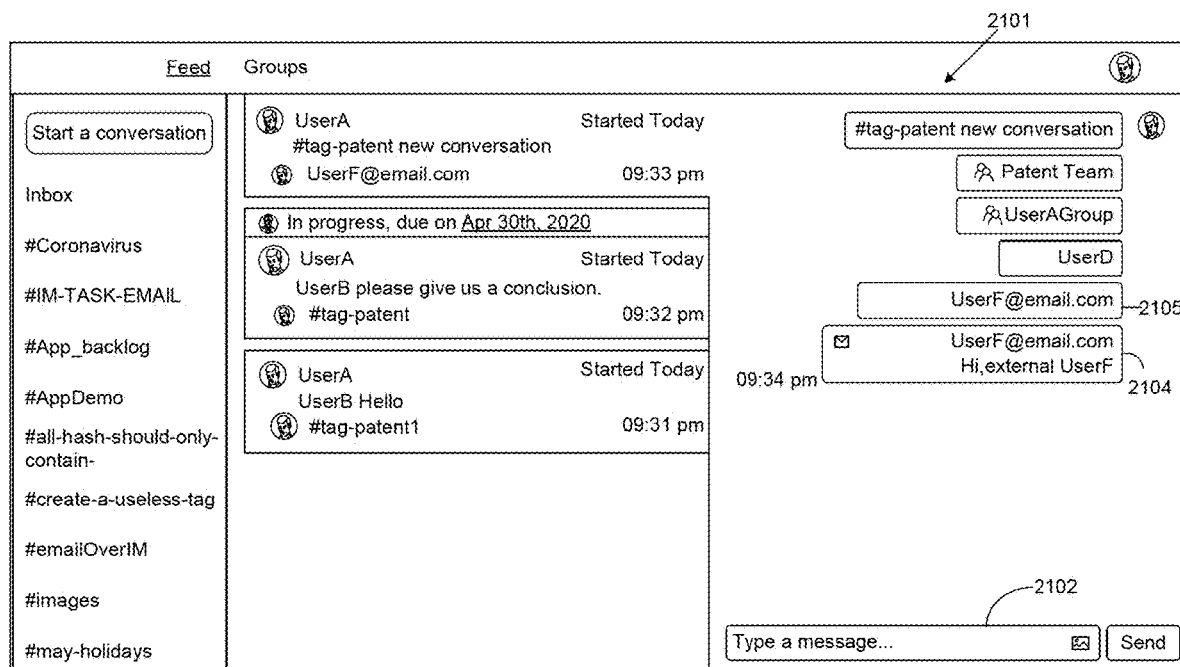
FIG. 21 shows an example user interface of a messaging application in which an email address may be added to a conversation.

At 2002, the chat service 222 receives an input from, e.g., a user device. In particular, the chat service 222 receives the input in the form of a message via the messaging application operating on a user device, such as via an input field of a UI of the messaging application 240. FIG. 21 provides an illustration of an example UI inviting an email participant to a conversation 2101 and entering messages addressed to the email participant. In order to include an external email participant A in the conversation 2101, a user enters a message in the form of an external address such as an email address. In the specific example UI 2100 illustrated in FIG. 21, the user has entered the email address UserF@gmail.com 2105. Consequently, the chat service parses the message and recognizes it as an email address associated with an entity external to the messaging service (i.e., email participant A). The email address is further associated with an email service 254. The example illustrates that the user has entered an email address including the domain "gmail.com." Other embodiments could employ email aliases that are previously known to the messaging service that are denoted, for example, by a predefined character.

Referring back to FIG. 20, at 2008, the chat service 222 stores an association of the email address and the conversation, such as in the conversation metadata 230 and the email user database 237. Once the email participant A is invited and authorized to access the conversation, the messaging service (e.g., messaging service 220) may generates an identifier for identifying the conversation. The identifier may be used for identifying the conversation by an email service external to the messaging service 220 and associated with the email address of the email participant. In another example, the messaging service 220 may generate the identifier for identifying the conversation to be used by an external email service before any email participant is invited to the conversation. The messaging service may send the identifier to the external email service associated with the email participant. By the way of example without limitation, the identifier for identifying the conversation may be a return email address corresponding to the conversation. The external email service may then send an email to the return email address associated with the conversation. In response to a determination that the email is received from the email address associated with the conversation, the messaging service may generate a message based on the email and send the message to the messaging applications (e.g., messaging applications 240) associated with the participants of the conversation for display of the message generated based on the email. On the other hand, in response to determining that the email is not from the email address associated with conversation, the messaging service will disregard the email and/or send back a notification that it is prohibited from sending email to the return email address corresponding to the conversation.

FIG. 21 shows an example UI 2100 of the messaging application (e.g., messaging application 240). The UI 2100 may include the conversation 2101. The conversation 2101 may include an input field 2102. User inputs may be received via the input field 2102. Example input 2104 addressed to the email participant includes a content: "Hi, external User F." The example input (i.e., message in the conversation 2101) 2104 includes an email address: UserF@gmail.com. The email address and the content may be entered in the input field 2102.

At 2009, the chat service 222 finds existing participants in the conversation. The existing participants may be users of the messaging service and/or existing external emails users. The chat service 222 finds the participants based on the conversation metadata. To that end, the chat service 222 finds the participants by querying the user database 234 for users who are associated with the conversation and the email user database 237 for users who are participants. After receiving an indication that an email participant has been added to the conversation, subsequent messages may be added to the conversation and email messages are generated and sent to the email address associated with the email participant A as explained more fully below.

In some embodiments, the messaging service 220 may generate an email message upon receiving a message in the conversation comprising information identifying the email participant A (e.g., the email address associate with email participant A). The email message is generated in accordance with an email protocol associated with the email service 254. The generated email message contains at least a subset of the received message and the email address. In some embodiment, the generated email message may further comprise a return email address generated by the messaging service 220 and corresponding to the conversation. In further examples, the messaging service 220 may generate a plurality of return email addresses corresponding to a plurality of conversations, respectively. The generated email message may be sent by the messaging service 220 (e.g., the email service 254) to an external email service associated with the email address for delivery to the email inbox of the email participant A. In other embodiments, the external email participant receives a single subsequent message or at least a subset of the subsequent messages. In yet other embodiments, all subsequent messages in the conversation are sent to the external email participant A.

The chat service 222 sends the new message along with an indication of the participants of the conversation to push service 224 of the messaging application. At 2011, the push service 224 notifies existing participants of the message containing the external email address. Notifying the existing participants may include sending the message and/or an indication of the email address to the participants of the conversation. Notifying the existing participants may include causing the message and/or the email address to be displayed in the conversation.

The push service 224 may send an indication of the message to the email service 254 of the messaging application. The email service 254 may be a service that is part of the messaging service. In embodiments, the email service 254 formats the one or more messages into the form of an email according to an email protocol such as SMTP. As such, the email service may add the external email address associated with the email participant A to a header field of the generated email message and adds the message content to the body of the generated email message. Additionally, in embodiments, the email service 254 adds information in the email message indicative of the conversation from the message content originated, such as a return email address corresponding to the conversation and generated by the messaging service 220.

In particular, replies to the email message that are received by the messaging service by way, e.g., of the email service 254 comprise information indicative of an association the conversation (e.g., the return email address corresponding to the conversation). Information associated with the replies may be pushed to messaging applications associated with the participants of the conversation for display of at least a content of the replies to the email message. Consequently, information (e.g., return email address corresponding to the conversation) added to the email message and also included in any reply to the email message facilitate identifying the corresponding conversation so as to push information associated with the reply to the email message to messaging applications associated with the participants of the conversation.

Figure 22:
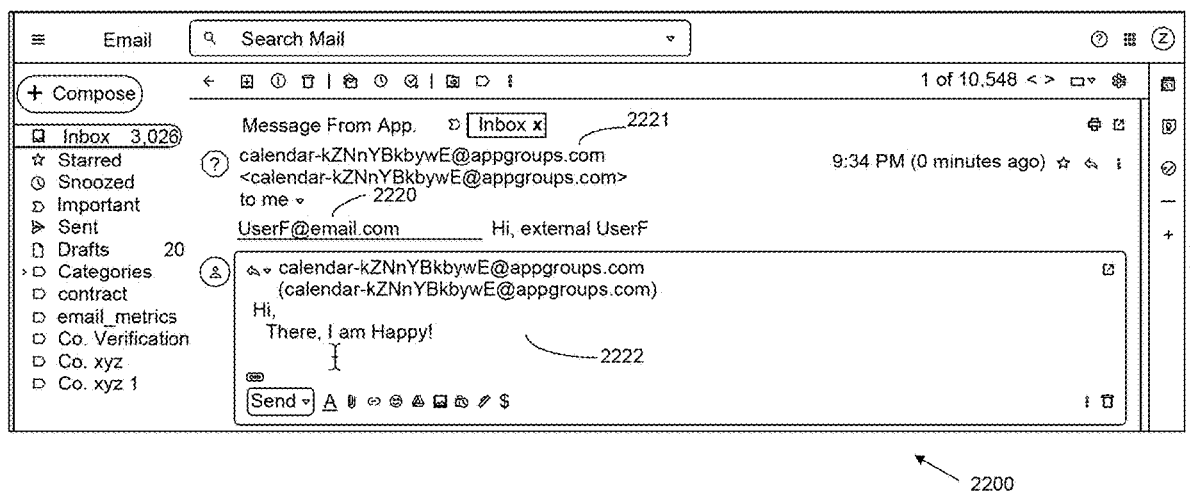
FIG. 22 shows an example of an email message received at an email address and sent from a messaging service.

As described above, one example for this association is that the messaging service 220 (e.g., the email service 254) generates a corresponding return email address associated with each conversation. By the way of example and without any limitation, the generated return email may comprise at least a partially randomized text string. For example, as shown in FIG. 22, the messaging service sent an email to the UserF@gmail.com 2220 email participant with the return email address calendar-kZNnYBkbywE@feishugroups.com 2221. That return email address is associated with the particular conversation that originated the message to be sent to the external email address 2220 as illustrated in FIG. 21. That return email address 2221 is added to the email header in the from field of the email message. Replies to the return email address 2221 can then be used by the messaging service (e.g., messaging service 220) to associate the reply email with a particular conversation.

Techniques may be used to prevent spoofing the messaging service with reply email and junk email. For example, the return email address may be generated by a form of a random email address generator. In the present example, the return email address 2221 contains "kZNnYBkbywE" which is randomly selected and not easily predicted or spoofed. Consequently, it assists to reduce conversations from receiving unwanted SPAM. In other examples, the email header may contain specific information that are used to identify a conversation such as in the subject line or in other header fields. Such identifiers may contain random or difficult to predict character sequences that may be used by the messaging service to assist in the prevention or control of SPAM. Any or all of the above described data may be stored in a database such as the email message database 238 for later association and classification of reply email messages.

Consequently, at 2013, the email service 254 may send the formatted email message to the email address associated with the email participant As. Sending the email message to the email address may include sending the email message to a domain associated with the email address. As noted, sending the email message to the email address may include sending other information from the conversation to the email address. FIG. 22, illustrates that the email message was received by the email participant, e.g., UserF@gmail.com 2220. The email participant thereafter has prepared a reply email 2222 including the text "Hi, there. I am happy!" and sends the rely email 2222 to the return email address associated with the messaging service and corresponding to the particular conversation.

The email service 254 may receive a reply to the message from the email address. The reply may be received by the email service 254 at the generated return email address corresponding to the conversation. The email service 254, e.g., using information contained in the reply email, will associate the return email address with the corresponding conversation such as by querying the databases 260 (e.g., email message database 238) and determining the conversation to which the reply to the email message is associated. In an embodiment, the messaging service 220 (e.g., email service 254) formats the reply into the form of a message and sends the message to the push service 224 by way of chat service 222. The push service 224 may then send the message corresponding to the reply to the messaging applications associated with the participants in the conversation. In some embodiments, a conversation may comprise other email participants (e.g., email participant B) in addition to the email participant A. In that case, the messaging service 220 may further generate an email message based on the message formatted by the messaging service 220 and corresponding to the reply from the email participant A; and the messaging service 220 then sends the generated email message to the other email participants (e.g., email participant B).

Figure 23:
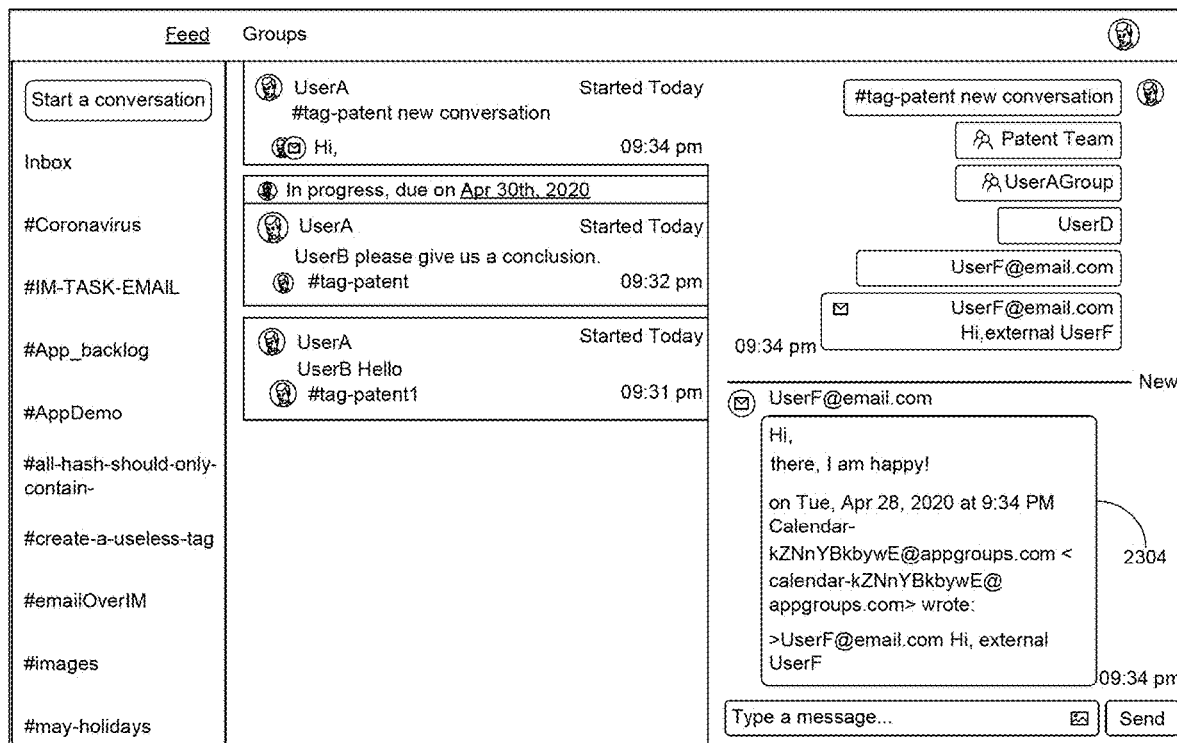
FIG. 23 shows an example user interface of a messaging application in which a message sent from an email address may be displayed in a corresponding conversation.

FIG. 23 shows an example UI 2300 of the messaging application (e.g., messaging application 240). The UI 2300 may be the same or similar to the UI 2100 in FIG. 21. The UI 2300 includes a continuation of conversation from FIG. 21. Based on receiving the reply email 2222 from the email address and the external email system (e.g., external email system 2200 in FIG. 22), the messaging service (e.g., messaging service 220) may generate a message, and add the message to the conversation, and send the message to the messaging applications associated with the participants of the conversation for display of the message 2304 that corresponds to the reply email 2222. In the example shown, the external email address UserF@email.com is displayed with the message 2304. Other metadata, such as a time that the message was sent to the messaging application associated with the participants of the conversation may also be displayed.

In some embodiments, the messaging application 240 may receive information entered by a user in a conversation. The information may comprise an email address and content to be sent to the email address. The messaging application 240 may then send the information to the messaging service 220. Upon receiving the information, the messaging service 220 may send an identifier for identifying the conversation and the content to an email service external to the messaging service 220 and associated with the email address. In other embodiments, the messaging service 220 may receive an email from the external email service. In that case, the messaging service 220 may determine that the email is associated with the conversation based on a determination that the email comprises the identifier for identifying the conversation. The messaging service 220 may then generate a message comprising content of the email and send the generated message to the messaging applications 240 for display of the generated message.

Figure 24:
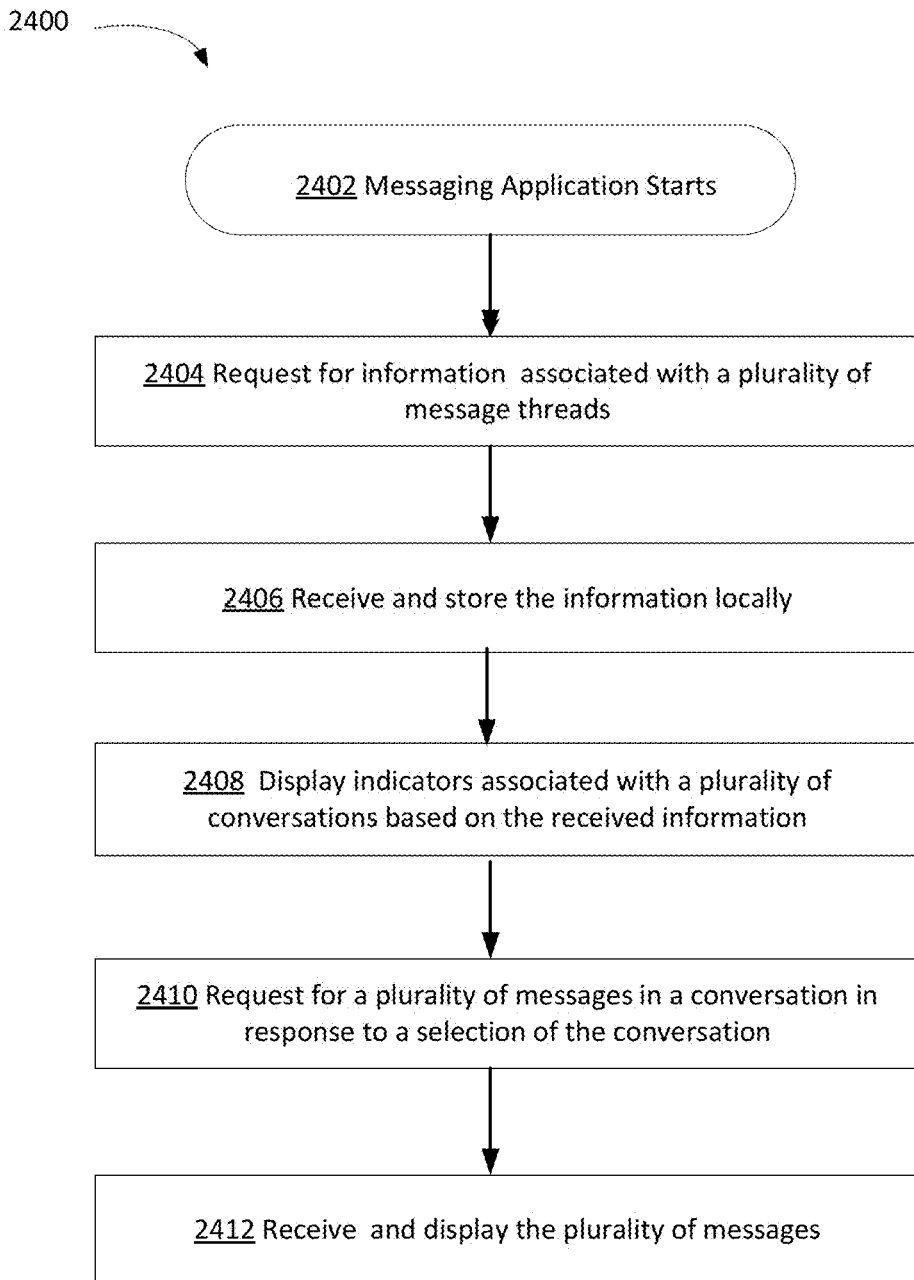
FIG. 24 shows an example process, which may be performed by a messaging application in accordance with the present disclosure.

FIG. 24 illustrates an example process 2400 performed by a messaging application (e.g., messaging application 240) in accordance with the present disclosure. Although depicted as a sequence of operations, those of ordinary skill in the art will appreciate that various embodiments may add, remove, reorder, or modify the depicted operations.

At 2402, the messaging application 240 starts to operate on a device (e.g., user device 242) associated with a user of a messaging service (e.g., messaging service 220). At 2404, the messaging application 240 sends to the messaging service 220 a request for information associated with conversations (i.e., message threads) in which the user is involved. In some embodiments, the requested information comprises metadata associated with the conversation, e.g., a thread identification (ID) corresponding to each of the conversations. The requested information further comprises information indicative of attributes associated with the conversations, such as topics, users, groups, tasks, etc. associated with the conversations. In other embodiments, the requested information may further comprise data indicative of summaries of the conversations, e.g., a subset of messages of each conversation. In an example the subset of messages of each conversation may be an initial message and a last message in the conversation.

At 2406, the messaging application 240 receives the requested information and stores the requested information locally, e.g., within the user device 242. In some embodiments, the received information, including thread IDs and attributes of the conversation, may be stored in a local storage, e.g., browser cache. In other embodiments, the thread IDs and attributes of the conversations may be stored in a local database. At 2408, the message application 240 displays indicators of the conversations. The indicators of the conversations may comprise topics prefaced by a predetermined character (e.g., a hashtag #) associated with the conversations. The indicators of the conversations may also comprise users or groups prefaced by another predetermined character (e.g., an @ sign) associated with the conversations. The indicators of the conversation may further comprise summaries of the conversations.

FIG. 25 illustrates an example user interface (UI) 2500 of the messaging application 240. In this example, indicators of the conversations categorized by topics (e.g., "patent" 2502) and categorized by users (e.g., "UserA" 2503) or groups (e.g., "Group1" 2504) are displayed in the leftmost column 2506. Summaries of the conversations are displayed in the area 2508 next to the leftmost column 2506. Task attributes of the conversations may also be displayed together with the summaries of the conversations. For instance, as shown in FIG. 25, the status of task 2512 and a change to the task due date 2514 are displayed together with the summaries 2516 and 2518, respectively. It should be appreciated that the UI 2500 in FIG. 25 is merely illustrative and other display arrangements might be utilized.

Referring back to FIG. 24, the messaging application 240 may receive a user input indicative of a selection of an indicator or summary of a conversation among the plurality of conversations. Upon receiving the user input, the messaging application 240 sends to the messaging service a request for the messages in the selected conversation at 2410. The request comprises the thread ID of the selected conversation. At 2412, the messaging application 240 receives the messages of the selected conversation and displays the messages of the selected conversation. By way of example and without limitation, the messages of the selected conversation may be displayed in the rightmost area 2520 of the UI 2500 of the messaging application as shown in FIG. 25. In an example, the messaging application 240 may send a request for a plurality of messages in a conversation selected from a plurality of conversations with summaries. The message application 240 may then display content received in response to the request, wherein the content is associated with the plurality of messages in the selected conversation.

Figure 26:
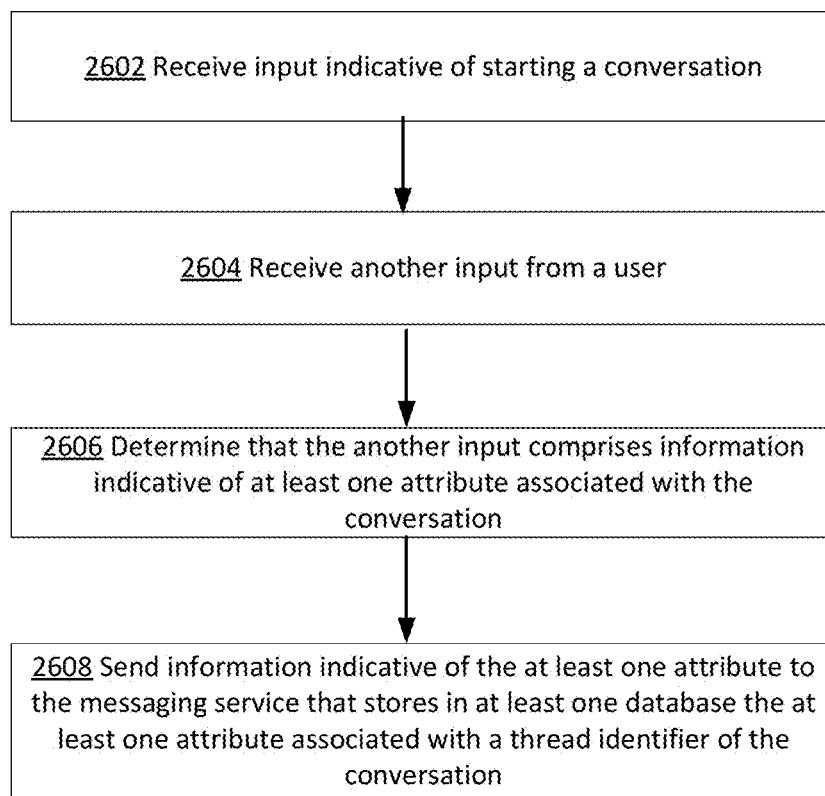
FIG. 26 shows another example process, which may be performed by a messaging application in accordance with the present disclosure.

FIG. 26 illustrates another example process 2600 performed by a messaging application (e.g., messaging application 240) in accordance with the present disclosure. Although depicted as a sequence of operations, those of ordinary skill in the art will appreciate that various embodiments may add, remove, reorder, or modify the depicted operations.

At 2602, the messaging application 240 receives input indicative of starting a new conversation. For example, a user may select the "New Conversation" button 2526 in the UI 2500 as shown in FIG. 25 to start a new conversation. In some embodiments, the messaging application 240 may generate a thread ID for the new conversation. In other embodiments, the thread ID for a new conversation may be generated by the messaging service 220 upon receiving information indicative of the new conversation sent from the messaging application 240.

Figure 27:
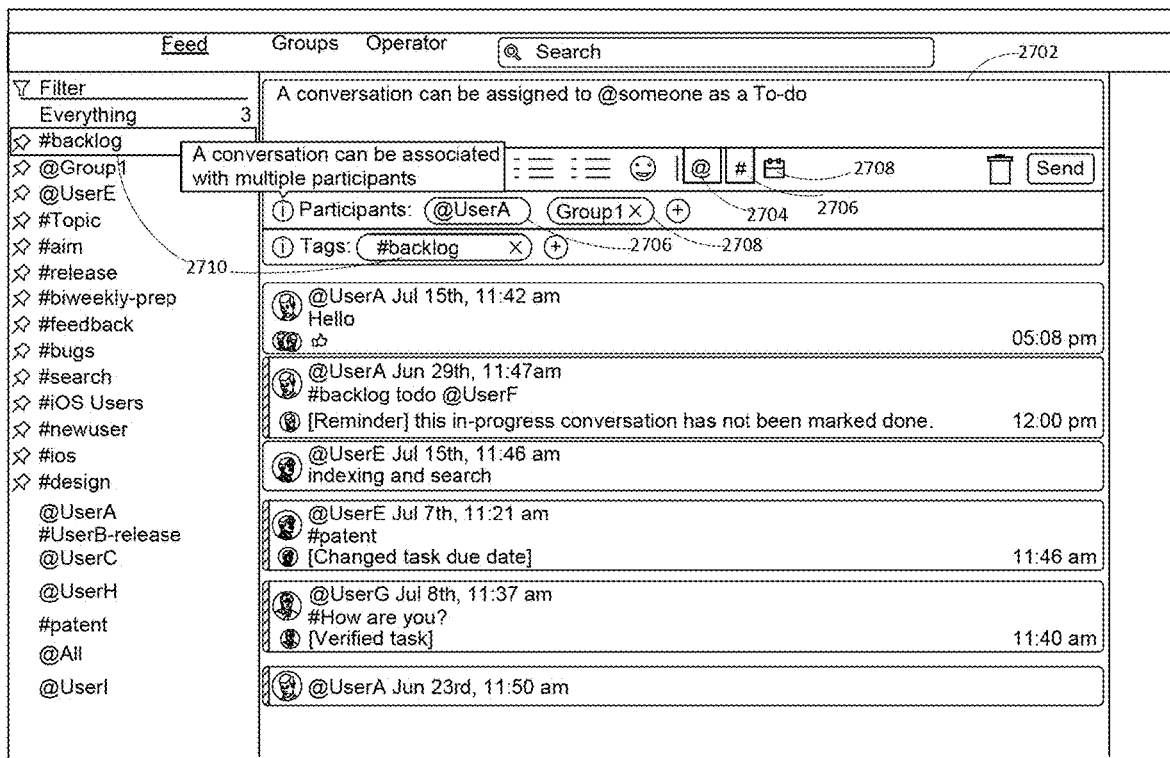
FIG. 27 shows an example user interface of a messaging application for creating a new conversation in accordance with the present disclosure.
Figure 28:
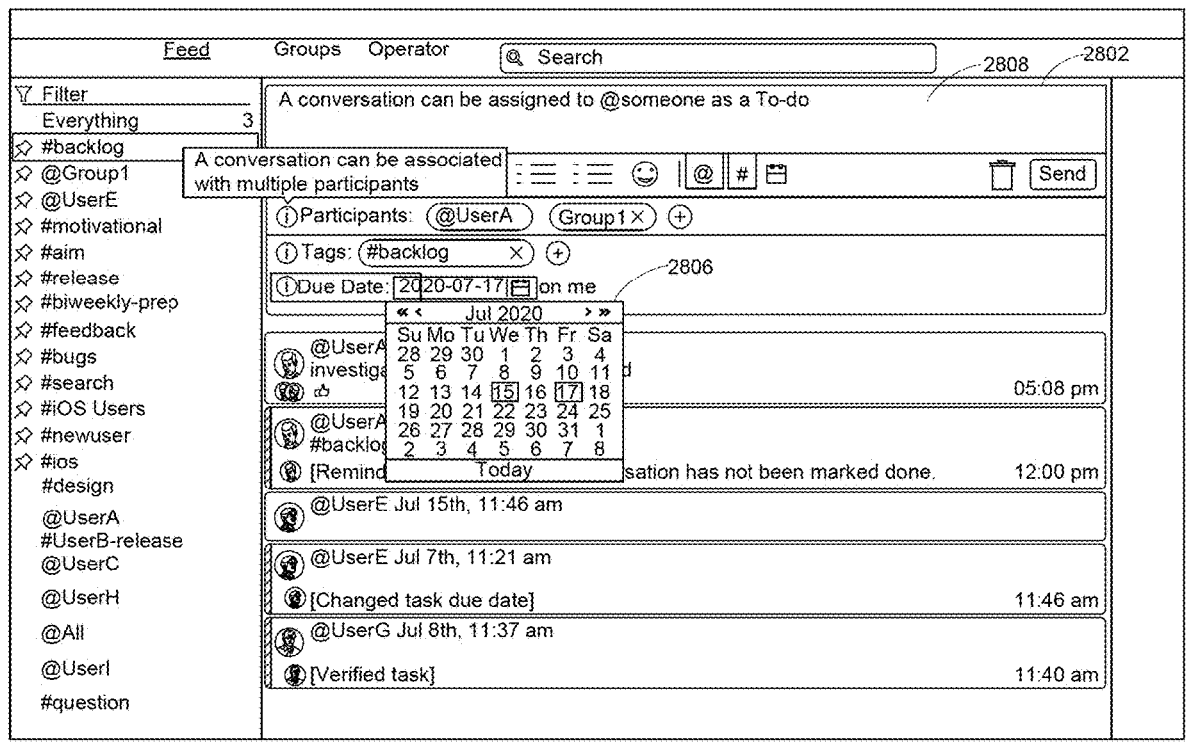
FIG. 28 shows another example user interface of a messaging application for creating a new conversation in accordance with the present disclosure.

At 2604, the messaging application 240 receives another input from a user. In some embodiments, the user input may be entered via a window 2702 and 2802 as shown in FIGS. 27 and 28. In response to the user input indicative of starting a new conversation, the messaging application 240 may cause a user device (e.g., user device 242) to display the window 2702 overlaid on a UI 2700 as shown in FIG. 27. The window comprises a plurality of selectable interface elements.

The window 2702 comprises representative symbols (e.g., @ symbol 2704, # symbol 2706, and calendar icon 2708) corresponding to attributes to be associated with the new conversation. In an example, a use may select the @ symbol 2704 to add one or more participants (e.g., UserA 2706 and Group1 2708) to the new conversation. In another example, a user may select the # symbol 2706 to add one or more topics (e.g., topic "backlog" 2710) to the new conversation. The one or more topics may be any existing topics listed on the leftmost column of the UI 2700. In the example, the existing topic "backlog" 2710 is selected and added to the new conversation. In another example, upon selecting the calendar icon 2708, a calendar UI 2806 with selectable dates is displayed, as shown in FIG. 28. In this example, a user selects a due date of Jul. 17, 2020 for a task assigned to a participant. Information indicative of the task may be typed into an input field 2808 of the window 2802.

In other embodiments, the messaging application 240 may receive data indicative of a message entered by a user. The message may be entered in a new or existing conversation by the user, such as via an input area 2522 of the UI 2500 as shown in FIG. 25.

At 2606, the messaging application 240 may determine that the user input comprises information indicative of one or more attributes associated with the conversation. The messaging application 240 may determine that the user input is indicative of at least one attribute based on a determination that the input is associated with a predetermined character. For example, the messaging application 240 may determine that the user input comprises information indicative of an attribute (e.g., topic, user or group) based on identifying a predetermined character (e.g., #, @, or any other predetermined characters). Each predetermined character (or characters) may denote an attribute, such as a topic, a user or a group. In other embodiments, the messaging service 220 may determine whether the user input comprises one or more attributes associated with the conversation upon receiving information from the messaging application 240.

In an example, a text string prefaced by the # symbol is determined as a topic associated with the conversation. In another example, a text string prefaced by the @ symbol is determined as a user or group invited to the conversation. In a further example, the messaging application 240 or the messaging service 220 may recognize a structure of an email address, e.g., text string (mailbox)+@+domain, to determine that the user input comprises an email address associated with the conversation.

At 2608, the messaging application 240 sends information indicative of at least one attribute associated with the conversation to the messaging service 220. Upon receiving the information indicative of the attribute, the messaging service 220 stores the attribute to a corresponding attribute database associated with a thread ID of the conversation. The attribute may be a topic, a user or group, an email address, etc. associated with the conversation. In some embodiments where the user input is provided by entering a message, the messaging application 240 may also send a content of the message and metadata associated with the message to the messaging service 220. The content of the message may be text, image, video, or audio content. The metadata may comprise a user ID (for the user who created the message), a timestamp indicating a time that the message was created, and so on. Upon receiving the content, and metadata of the message, the messaging service 220 stores the content and metadata of the message to the conversation (message thread) database 230.

Figure 29:
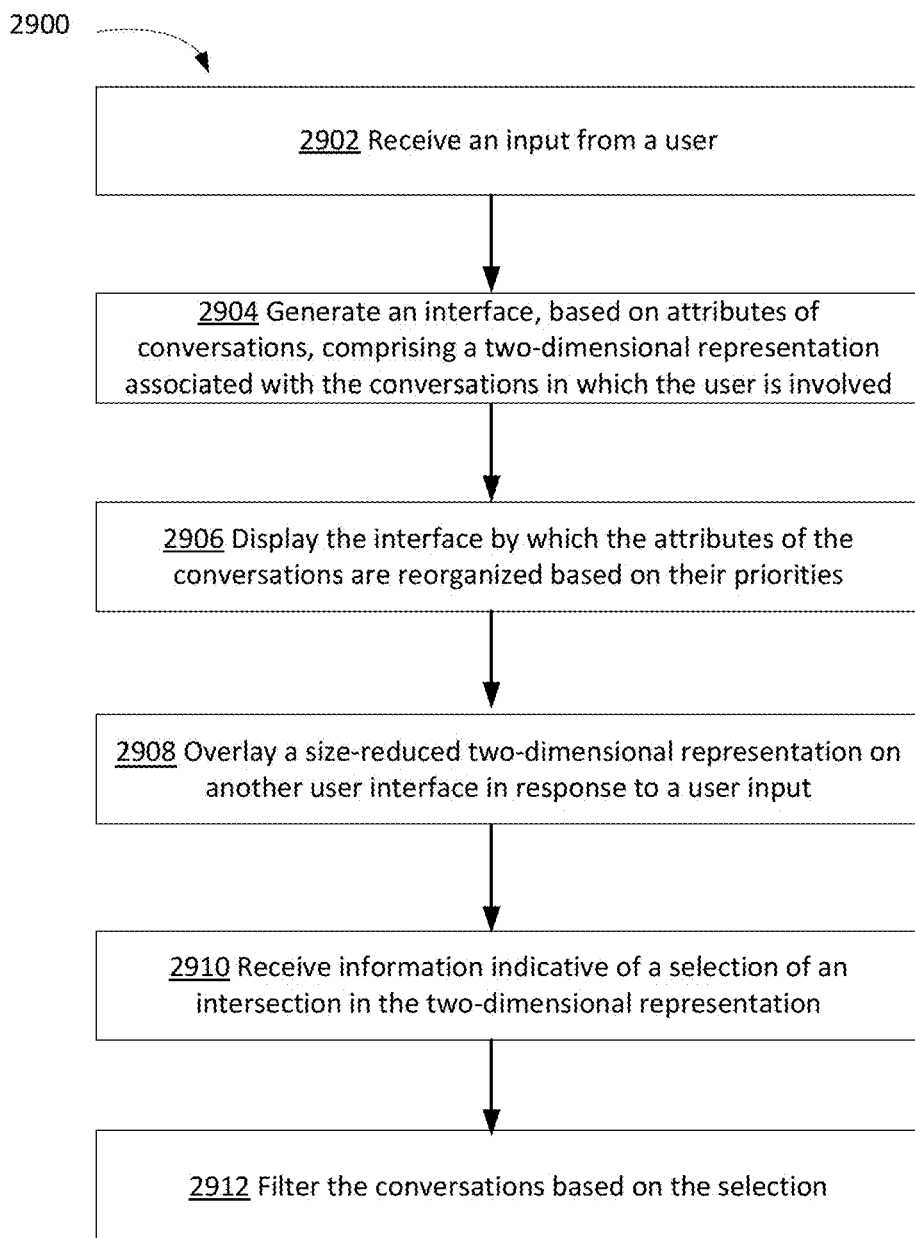
FIG. 29 shows an example process, which may be performed by a messaging application in accordance with the present disclosure.

FIG. 29 illustrates another example process 2900 performed by a messaging application (e.g., messaging application 240) in accordance with the present disclosure. Although depicted as a sequence of operations, those of ordinary skill in the art will appreciate that various embodiments may add, remove, reorder, or modify the depicted operations.

At 2902, the messaging application 240 receives input from a user. In an example, the user input may be provided by selecting the "Operator" option 2526 in the UI 2500 as shown in FIG. 25. At 2904, in response to the user input, the messaging application 240 generates an interface based on the attributes of the conversations in which the user is involved. At 2906, the messaging application 240 further displays the interface by which the user can rank the attributes of the conversations based on their priorities.

Unlike conventional messaging systems that organize messages in a single dimension, such as by timing of the messages, the messaging service 220 and/or the messaging application 240 in accordance with the present disclosure may organize conversations in multiple dimensions. Optionally, the messaging application 240 may generate an interface comprising a two-dimensional representation associated with a plurality of conversations. The two dimensions in the two-dimensional representation are based on a first attribute associated with the plurality of conversations and a second attribute associated with the plurality of conversations. The messaging device may display the interface by which a user may provide input indicative of reorganizing the attributes associated with plurality of the conversations. The messaging device may reorganize the two-dimensional representation in response to receiving the input.

By way of example and without limitation, FIG. 30 illustrates an interface 3000 comprising a two-dimensional table 3002. The two-dimensional table 3002 comprises a vertical axis 3004 and a horizontal axis 3006. In an example, the vertical axis 3004 may list all or a subset of the topics associated with the conversations in which the user is involved; the horizontal axis 3006 may list all or a subset of the users or groups (e.g., that have been mentioned in the conversations and prefaced by the @ symbol, i.e., "Mentions") with whom the user has conversations. In another example, the vertical axis may list all or some of the users or groups with whom the user has conversations and the horizontal axis may list all or some of the topics associated with the conversations in which the user is involved.

The user may reorganize the two-dimensional table 3002 by dragging a particular topic listed in the vertical axis 3004 or a particular Mention listed in the horizontal axis 3006 and dropping the particular topic or Mention at a different row or a different column. In an example, the two-dimensional table 3002 may be reorganized by the messaging application 240 based on the priorities of the attributes associated with the conversations. The topics listed in the vertical axis 3004 and/or the Mentions listed in the horizontal axis 3006 may be organized and displayed in any manner to reflect their respective priorities. By way of example and without limitation, the most important attributes may be moved to the top-left corner of the two-dimensional table 3002. In an example, the user may drag a topic that is the most important to the user (e.g., topic "bugs") and drop the topic "bugs" at the top of the vertical axis 3004. Similarly, the user may drag a Mention that is most important to the user (e.g., Mention "Boss") and drop the Mention "Boss" at the leftmost cell of the horizontal axis 3006. The two-dimensional table 3002 may comprise a leftmost column 3008 and a top row 3010 with a change of greyscale or colors indicating a decrease of the importance of the attributes listed from top to bottom and from left to right, respectively. In another embodiment, the most important attributes may be moved to the bottom-right corner of the two-dimensional table 3002. The leftmost column 3008 and the top row 3010 with a change of greyscale or colors may indicate an increase of the importance of the attributes listed from top to bottom and from left to right, respectively The two-dimensional table 3002 comprises a plurality of cells (intersections) defined by columns and rows of the table 3002. Each cell in the two-dimensional table 3002 is a selectable button by which the conversations can be filtered based on the corresponding attributes, e.g., topic and Mention attributes. Each of the plurality of intersections is associated with one or more conversations having the corresponding attributes. In an example, a number of unread conversations may be displayed in a cell of the two-dimensional table 3002. For instance, the number "2" 3012 is displayed in the cell 3014, which indicates that there are two conversations with unread messages among the conversations having the corresponding attributes (i.e., Topic1 3016 and UserA 3018). In another example, different cells may have different colors or any other suitable indicators. Different colors or other indicators included in cells may be indicative of different status of tasks associated with conversations having the corresponding attributes.

In some embodiment, the UI 3000 may comprise an "Enable" button 3019 which can toggle between enable and disable states of the "Operator" option 2526. In other embodiments, the UI 3000 may further comprise slidable buttons 3018, 3020, 3022 for toggling between enable or disable states of attributes, e.g., topic (e.g., hashtag) attribute, Mention attribute, and task status attribute. When either the topic attribute or Mention attribute is disabled, the UI 3000 will comprise a one-dimensional table instead of the two-dimensional table 3002. If the task status attribute is disable, the two-dimensional table 3002 will not indicate status of tasks by different colors or other means.

Referring back to FIG. 29, the messaging application 240 may overlay a size-reduced two-dimensional representation on another user interface at 2908. The two-dimensional table 3002 as shown in FIG. 30 presents the user useful information and attributes associated with the conversations and allows the user to reorganize the attributes of the conversations. However, the two-dimensional table 3002 may be relatively large, taking up too much screen space. Hence, the messaging application 240 may provide a size-reduced version of the two-dimensional table 3002 in response to a user input. The user input may be provided by selecting an icon 2530 as shown in FIG. 25.

Figure 31:
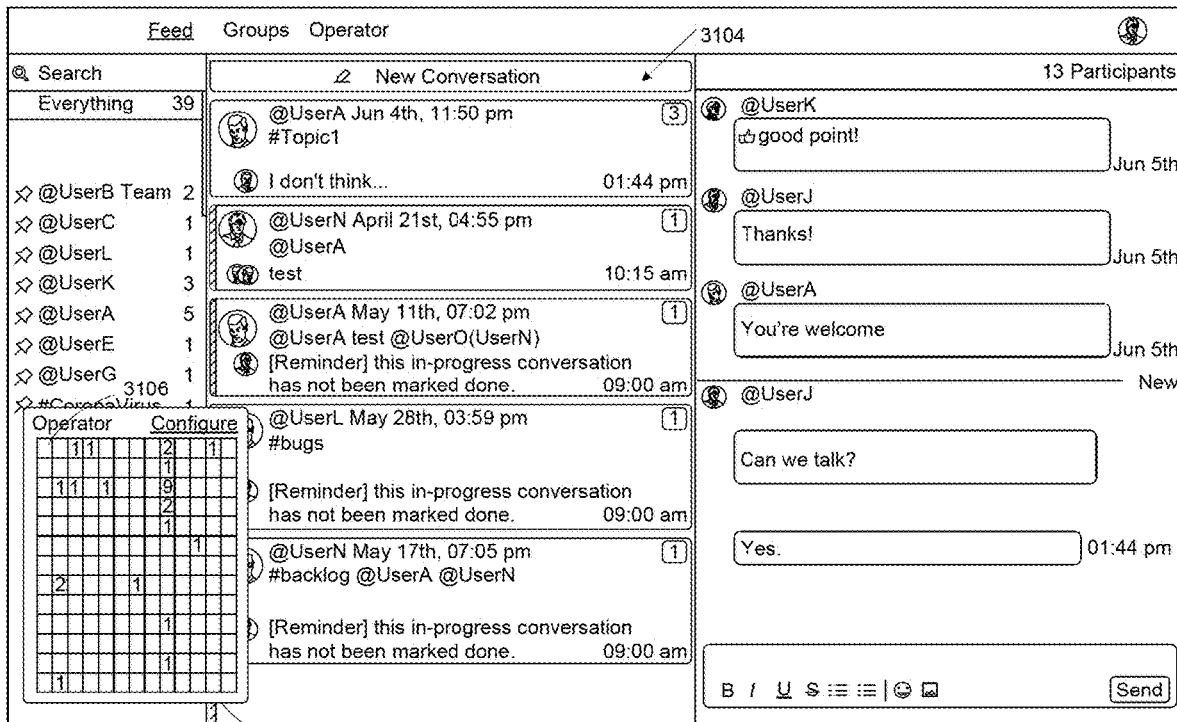
FIG. 31 shows another example user interface of a messaging application in which a two-dimensional representation is overlaid on another user interface.

FIG. 31 illustrates a size-reduced version 3102 of the two-dimensional table 3002. As shown in FIG. 31, the size-reduced table 3102 is overlaid on another user interface 3104. Like the two-dimensional table 3002, the size-reduced table 3102 may comprise a number indicating unread conversations in a cell. The size-reduced table 3102 may also have different colors in different cells indicative of different status of associated tasks. Similar to the cells in the two-dimensional table 3002, each cell in the size-reduced table 3102 is also a selectable button by which the conversations can be filtered based on the corresponding topic and Mention attributes. The size-reduced two-dimensional table allows the table to be overlaid on a UI so that the user can reference the table while using the UI. The reduced size can be predetermined based on screen size or defined by a user, e.g., by selecting and resizing the table directly or by entering size dimensions into a form.

Figure 32:
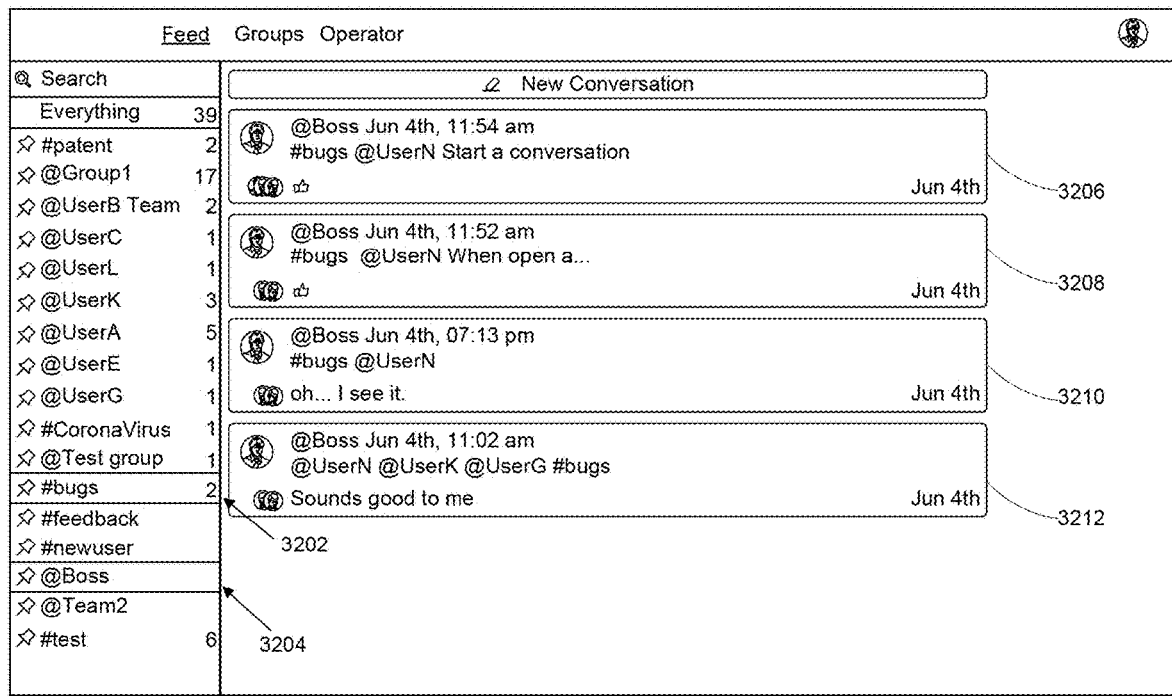
FIG. 32 shows a further example user interface of a messaging application in which the conversations are filtered in response to a selection of an intersection in a two-dimensional representation.

Referring back to FIG. 29, the messaging application 240 receives information indicative of a selection of an intersection in the two-dimensional representation at 2910. In an example, the user may select a cell in the two-dimensional table 3002 as shown in FIG. 30. In another example, the user may select a cell in the size-reduced table 3102 as shown in FIG. 31. At 2912, the messaging application 240 may filter the conversations in response to a selection of a cell in either the two-dimensional table 3002 or the size-reduced table 3102. The conversations are filtered by the messaging application based on the particular attributes corresponding to the selected cell. For example, in response to a selection of the cell 3036 in the two-dimensional table 3002 or the cell 3106 in the size-reduced table 3102, the messaging application 240 filters the conversations based on the corresponding attributes, i.e., the topic "bugs" and the Mention "Boss." FIG. 32 illustrates the filtered results. By way of example and without limitation, summaries 3206, 3208, 3210, and 3212 of the conversations having the attributes of the topic "bugs" 3202 and the Mention "Boss" 3204 are displayed in the UI 3200.

The above described aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources and services in different embodiments, including general-purpose or special-purpose computer servers, storage devices, network devices, and the like. In at least some embodiments, a server or computing device that implements at least a portion of one or more of the technologies described herein, including the techniques to implement the functionality of the messaging service 220 and the messaging application 240 may include a general-purpose computer system that includes or is configured to access one or more databases and/or computer-accessible media.

Figure 33:
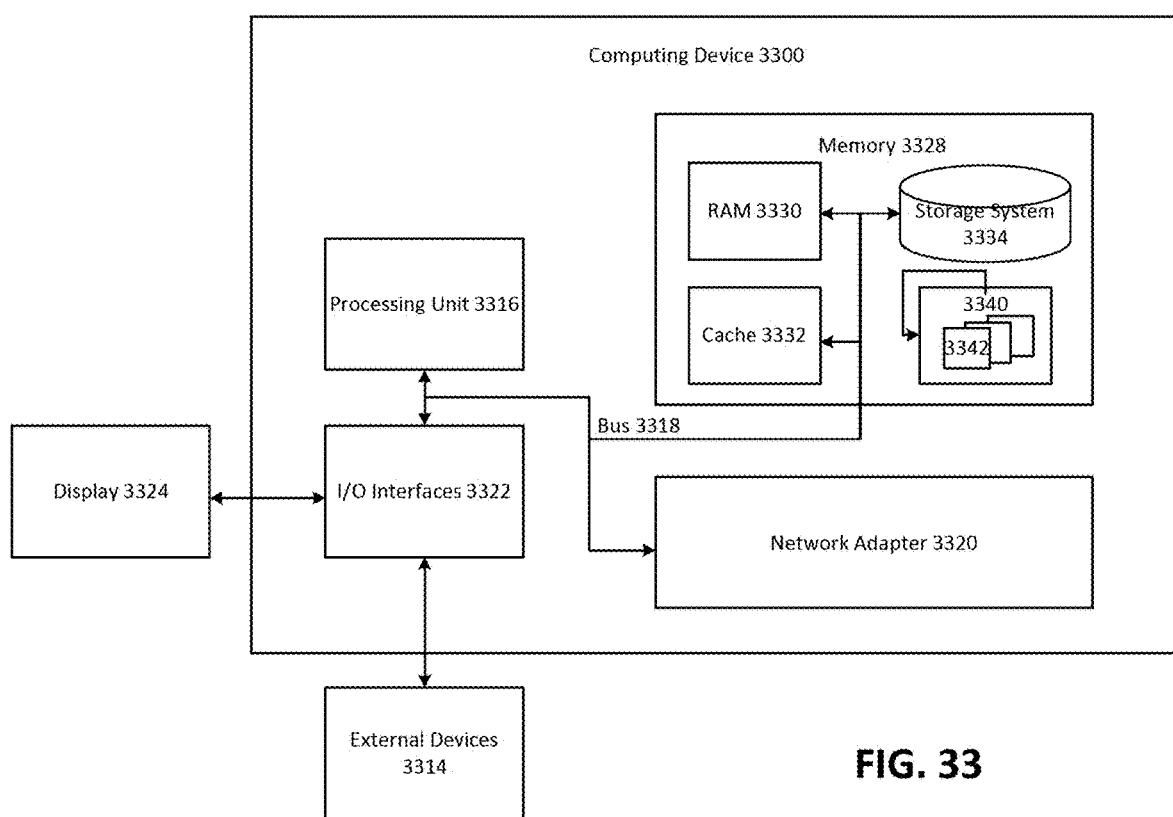
FIG. 33 shows an example computing device which may be used to perform any of the techniques disclosed herein.

FIG. 33 shows such a general-purpose computing device 3300. The computing device 3300 may operate in a virtual environment, such as the environment 100 in FIG. 1. Computing device 3300 may be used to host the messaging service or the messaging application. Computing device 3300 may be configured to communicate with devices of users of the messaging application. Computing device 3300 may be a general-purpose computing device. Computing device 3300 may be an on-premises device, such as a node of a distributed system running in a user's data center. The components of computing device 3300 may include, but are not limited to, one or more processors or processing units 3316, a system memory 3328, and a bus 3318 that couples various system components including system memory 3328 to processor 3316.

The bus 3318 in the example of FIG. 33 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ('ISA') bus, Micro Channel Architecture ('MCA') bus, Enhanced ISA ('EISA') bus, Video Electronics Standards Association ('VESA') local bus, and Peripheral Component Interconnects ('PCI') bus.

Computing device 3300 may include a variety of computer system readable media. Such media may be any available media that is accessible by computing device 3300, and it includes both volatile and non-volatile media, removable and non-removable media. Computing device 3300 may include system memory 3328, which may include computer system readable media in the form of volatile memory, such as random access memory ('RAM') 3330 and/or cache memory 3332. Computing device 3300 may further include other removable/non-removable, volatile/non-volatile computer system storage media. By way of example only, a storage system 3334 may be provided for reading from and writing to a non-removable, non-volatile magnetic media (not shown and typically called a "hard drive"). Although not shown, a magnetic disk drive for reading from and writing to a removable, non-volatile magnetic disk, e.g., a "floppy disk," and an optical disk drive for reading from or writing to a removable, non-volatile optical disk such as a CD-ROM, DVD-ROM or other optical media may be provided. In such instances, each may be connected to bus 3318 by one or more data media interfaces. As will be further depicted and described below, memory 3328 may include at least one program product having a set, e.g., at least one, of program modules that are configured to carry out the functions of embodiments of the invention.

Computing device 3300 may include a program/utility 3340 having a set (at least one) of program modules 3342 that may be stored in memory 3328. Computing device 3300 of FIG. 33 may also include an operating system, one or more messaging application programs, other messaging application program modules, and messaging application program data. Each of the operating system, one or more messaging application programs, other messaging application program modules, and messaging application program data or some combination thereof, may include an implementation of a networking environment, such as the cloud computing system 100 in FIG. 1. Program modules 3342 generally carry out the functions and/or methodologies of embodiments of the invention as described herein.

Computing device 3300 of FIG. 33 may also communicate with one or more external devices 3314 such as a keyboard, a pointing device, a display 3324, and so on that enable a user to interact with computing device 3300. Computing device 3300 may also include any devices, e.g., network card, modem, etc., that enable computing device 3300 to communicate with one or more other computing devices. Such communication may occur, for example, via I/O interfaces 3321. Still yet, computing device 3300 may communicate with one or more networks such as a local area network ('LAN'), a general wide area network ('WAN'), and/or a public network, e.g., the Internet, via network adapter 3320. As depicted, network adapter 3320 communicates with the other components of computing device 3300 via bus 3318. It should be understood that although not shown, other hardware and/or software components could be used in conjunction with computing device 3300. Examples include, but are not limited to, microcode, device drivers, redundant processing units, external disk drive arrays, RAID systems, tape drives, and data archival storage systems, and so on.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing device, comprising:
   at least one processor; and
   at least one memory communicatively coupled to the at least one processor and storing instructions that upon execution by the at least one processor cause the computing device to:
   receive from a user interface a first input indicative of starting a first conversation;
   receive a second input by a first user;
   determine that the second input is indicative of at least one attribute associated with the first conversation;
   send to a messaging service information comprising information indicating a start of a new conversation and information indicating that the at least one attribute is associated with the first conversation; and
   the at least one memory further storing instructions that upon execution by the at least one processor cause the client computing device to:
   generate and display an interface based on attributes of a plurality of conversations, wherein the interface comprises a two-dimensional representation associated with the plurality of conversations, wherein the two dimensions in the two-dimensional representation are based on a first attribute associated with the plurality of conversations and a second attribute associated with the plurality of conversations.

2. The computing device of claim 1, the at least one memory further storing instructions that upon execution by the at least one processor cause the client computing device to:
   send a request for information to the messaging service;
   store received information responsive to the request, the received information comprising information indicative of a plurality of attributes associated with the plurality of conversations, wherein each of the plurality of conversations has a corresponding thread ID; and
   display a plurality of indicators associated with the plurality of conversations based on the received information.

3. The computing device of claim 2, the at least one memory further storing instructions that upon execution by the at least one processor cause the client computing device to:
   send a request for a plurality of messages in a second conversation selected from the plurality of conversations; and
   display content received in response to the request, the content associated with the plurality of messages in the second conversation.

4. The computing device of claim 1, the at least one memory further storing instructions that upon execution by the at least one processor cause the client computing device to:
   send a request for information indicative of the plurality of conversations;
   display summaries for at least some of the plurality of conversations based on the received information.

5. The computing device of claim 1, the at least one memory further storing instructions that upon execution by the at least one processor cause the client computing device to:
   display the interface by which a second user provides input indicative of reorganizing attributes associated with the plurality of conversations; and
   reorganize the two-dimensional representation in response to receiving the input.

6. The computing device of claim 1, wherein at least one intersection in the two-dimensional representation comprises:
   an indicator indicative of a status of at least one task associated with at least one conversation among the plurality of conversations; or
   a number indicative of conversations with unread messages among the plurality of conversations.

7. The computing device of claim 1, the at least one memory further storing instructions that upon execution by the at least one processor cause the client computing device to:

receive information indicative of a selection of an intersection in the two-dimensional representation; and filter the plurality of conversations in response to receiving the information based on attributes corresponding to the selected intersection.

8. The computing device of claim 1, wherein the second input is provided by selecting an existing indicator of the at least one attribute.

9. The computing device of claim 1, wherein the second input is provided by entering a message comprising a predetermined character indicative of a type of the at least one attribute.

10. The computing device of claim 1, wherein the at least one attribute comprises at least one of a topic attribute, a user attribute, a group attribute, a task attribute, or an email message attribute.

11. The computing device of claim 1, the at least one memory further storing instructions that upon execution by the at least one processor cause the client computing device to:
determine that the second input is indicative of at least one attribute based on a determination that the second input is associated with a predetermined character.

12. The computing device of claim 1, the at least one memory further storing instructions that upon execution by the at least one processor cause the client computing device to:
display a third user interface in response to receive a third input, wherein the third user interface comprises information associated with at least one group that participates in one or more conversations.

13. The computing device of claim 1, the at least one memory further storing instructions that upon execution by the at least one processor cause the client computing device to:
receive a messaging in the first conversation;
determine that the message comprises information identifying a second user;
receive information indicative of a date associated with the message; and
send the message and the information indicative of the date associated with the message to a messaging service, wherein the message is indicative of a task assigned to the second user.

14. The computing device of claim 1, the at least one memory further storing instructions that upon execution by the at least one processor cause the client computing device to:
display a status of a task associated with a third conversation among the plurality of conversations.

15. A method, comprising:
receiving from a user interface a first input indicative of starting a first conversation;
receiving a second input by a first user;
determine that the second input is indicative of at least one attribute associated with the first conversation;
sending to a messaging service information comprising information indicating a start of a new conversation and information indicating that the at least one attribute is associated with the first conversation, wherein the messaging service stores in at least one database the at least one attribute associated with a thread identifier (ID) of the first conversation; and
wherein the method further comprises generating and displaying an interface based on attributes of a plurality of conversations, wherein the interface comprises a two-dimensional representation associated with the plurality of conversations, wherein the two dimensions in the two-dimensional representation are based on a first attribute associated with the plurality of conversations and a second attribute associated with the plurality of conversations.

16. The method of claim 15, further comprising:
sending a request for information to the messaging service;
storing received information responsive to the request, the received information comprising information indicative of a plurality of attributes associated with the plurality of conversations, wherein each of the plurality of conversations has a corresponding thread ID; and
displaying a plurality of indicators associated with the plurality of conversations based on the received information.

17. The method of claim 16, further comprising:
sending a request for a plurality of messages in a second conversation selected from the plurality of conversations; and
displaying content received in response to the request, the content associated with the plurality of messages in the second conversation.

18. The method of claim 15, further comprising:
sending a request for information indicative of the plurality of conversations; and
displaying summaries for at least some of the plurality of conversations based on the received information.

19. The method of claim 15, further comprising:
receiving information indicative of a selection of an intersection in the two-dimensional representation; and
filtering the plurality of conversations in response to receiving the information based on attributes corresponding to the selected intersection.

20. A non-transitory computer-readable storage medium, storing computer-readable instructions that upon execution on a computing device cause the computing device at least to:
receive from a user interface a first input indicative of starting a first conversation;
receive a second input by a first user;
determine that the second input is indicative of at least one attribute associated with the first conversation;
send to a messaging service data comprising information indicating a start of a new conversation and information indicating that the at least one attribute is associated with the first conversation, wherein the messaging service stores in at least one database the at least one attribute associated with a thread identifier (ID) of the first conversation; and
wherein the non-transitory computer-readable storage medium further stores computer-readable instructions that upon execution on the computing device cause the computing device at least to:
generate and display an interface based on attributes of a plurality of conversations, wherein the interface comprises a two-dimensional representation associated with the plurality of conversations, wherein the two dimensions in the two-dimensional representation are based on a first attribute associated with the plurality of conversations and a second attribute associated with the plurality of conversations.

21. The non-transitory computer-readable storage medium of claim 20, further storing computer-readable instructions that upon execution on the computing device cause the computing device at least to:

send a request for information to the messaging service;
store received information responsive to the request, the received information comprising information indicative of a plurality of attributes associated with the plurality of conversations, wherein each of the plurality of conversations has a corresponding thread ID; and
display a plurality of indicators of the plurality of conversations based on the received information.

22. The non-transitory computer-readable storage medium of claim 21, further storing computer-readable instructions that upon execution on the computing device cause the computing device at least to:
send a request for a plurality of messages in a second conversation selected from the plurality of conversations; and
display content received in response to the request, the content associated with the plurality of messages in the second conversation.

* * * * *